(12) United States Patent
Oh et al.

(10) Patent No.: US 11,216,236 B2
(45) Date of Patent: Jan. 4, 2022

(54) DISPLAY DEVICE, TILED DISPLAY APPARATUS, AND METHOD OF MANUFACTURING THE SAME

(71) Applicant: Samsung Display Co. Ltd., Yongin-si (KR)

(72) Inventors: Sun Hee Oh, Anyang-si (KR); Dong Hyeon Lee, Seoul (KR); Jun Woo You, Seongnam-si (KR); Tae Ho Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 46 days.

(21) Appl. No.: 16/394,922

(22) Filed: Apr. 25, 2019

(65) Prior Publication Data

US 2020/0133614 A1  Apr. 30, 2020

(30) Foreign Application Priority Data

Oct. 25, 2018  (KR) .......................... 10-2018-0128102

(51) Int. Cl.
  *G06F 3/14*   (2006.01)
  *G09F 9/302*  (2006.01)
  *G02B 6/122*  (2006.01)

(52) U.S. Cl.
  CPC ......... *G06F 3/1446* (2013.01); *G02B 6/1223* (2013.01); *G09F 9/3026* (2013.01)

(58) Field of Classification Search
  CPC ........... G02F 1/133524; G02F 1/13336; G02F 1/133504; G02F 1/1641; G02F 1/133526; G02B 1/045; G06F 3/1446; G06F 1/1641; G09F 9/3026; G09F 9/305; G09G 2300/02; G09G 2300/026; G09G 2360/122; G09G 2370/18; H01L 27/3293; H01L 31/0232; H01L 51/5275
  See application file for complete search history.

(56) References Cited

U.S. PATENT DOCUMENTS

| | | | | |
|---|---|---|---|---|
| 5,465,315 A | * | 11/1995 | Sakai | G09F 9/305 385/116 |
| 5,502,457 A | * | 3/1996 | Sakai | G02F 1/133524 345/87 |
| 5,572,034 A | * | 11/1996 | Karellas | G01T 1/2018 250/367 |
| 2005/0220438 A1 | * | 10/2005 | Cok | G02B 6/3676 385/146 |
| 2014/0218971 A1 | * | 8/2014 | Wu | G02B 6/08 362/613 |

(Continued)

FOREIGN PATENT DOCUMENTS

| | | |
|---|---|---|
| KR | 1020120121584 | 11/2012 |
| KR | 1020150071406 | 6/2015 |
| KR | 1020160016062 | 2/2016 |

*Primary Examiner* — Nitin Patel
*Assistant Examiner* — Amen W. Bogale
(74) *Attorney, Agent, or Firm* — Cantor Colburn LLP

(57) ABSTRACT

A display device includes a display panel including a display area and a non-display area; and an optical plate disposed on the display panel and including an optical waveguide and a body portion surrounding the optical waveguide. The optical waveguide includes an input terminal which is disposed on the display area and receives light from the display panel and an output terminal which is disposed over the non-display area and outputs the light.

15 Claims, 20 Drawing Sheets

(56) References Cited

U.S. PATENT DOCUMENTS

| | | | |
|---|---|---|---|
| 2015/0091833 A1* | 4/2015 | Wu | G02F 1/133524 |
| | | | 345/173 |
| 2015/0092395 A1* | 4/2015 | Wu | G02B 6/0061 |
| | | | 362/97.1 |
| 2015/0093086 A1* | 4/2015 | Wu | G02B 6/08 |
| | | | 385/132 |
| 2017/0094814 A1* | 3/2017 | Chin | G02B 6/00 |
| 2017/0094815 A1* | 3/2017 | Chin | G02B 6/08 |
| 2017/0371201 A1* | 12/2017 | Yang | G02F 1/133524 |

* cited by examiner

DISPLAY DEVICE, TILED DISPLAY APPARATUS, AND METHOD OF MANUFACTURING THE SAME

This application claims priority to Korean Patent Application No. 10-2018-0128102, filed on Oct. 25, 2018, and all the benefits accruing therefrom under 35 U.S.C. § 119, the content of which in its entirety is herein incorporated by reference.

BACKGROUND

1. Field

Exemplary embodiments of the invention relate to a display device, a tiled display apparatus, and a method of manufacturing the display device.

2. Description of the Related Art

An importance of a display device has increased with a development of multimedia. Accordingly, various types of display devices such as a liquid crystal display ("LCD") and an organic light emitting display ("OLED") have been developed.

Around a glass substrate constituting the display device, there exists an area where a drive integrated circuit ("IC") or a printed circuit is provided, and this area may be expressed by a bezel that is a non-display area where an image is not displayed.

SUMMARY

In a case of a tiled display apparatus in which a plurality of display devices is arranged in a grid form to implement a large screen, the plurality of display devices is connected to each other, so that a non-display area in which bezel areas of the display device are arranged in a double manner is formed at connection sites of the display devices, thereby causing image immersion to deteriorate.

Exemplary embodiments of the invention are to provide a display device in which an image outputted from a display area may be expanded upward from a non-display area, a display apparatus including the display device, and a method of manufacturing the display device.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, there is provided a display device. The display device includes a display panel including a display area and a non-display area, and an optical plate disposed on the display panel and including an optical waveguide and a body portion surrounding the optical waveguide. The optical waveguide includes an input terminal which is disposed on the display area and receives light from the display panel and an output terminal which is disposed over the non-display area and outputs the light.

According to another exemplary embodiment of the invention, there is provided a tiled display apparatus. A tiled display apparatus includes a display device unit including a plurality of display devices each having a display area and a non-display area, and an optical plate disposed on the display panel and including an optical waveguide and a body portion surrounding the optical waveguide. The optical waveguide includes an input terminal which is disposed on the display area and receives light from the display panel and an output terminal which is disposed over the non-display area and outputs the light.

According to still another exemplary embodiment of the invention, there is provided a method of manufacturing a display device. A method of manufacturing a display device includes irradiating a body portion of an optical plate with a femtosecond laser beam to form a melting portion having a first inflection point and a second inflection point, and cooling the optical plate to decrease voids in the melting portion to form an optical waveguide.

BRIEF DESCRIPTION OF THE DRAWINGS

The above and other exemplary embodiments and features of the invention will become more apparent by describing in detail exemplary embodiments thereof with reference to the attached drawings, in which:

FIG. 1 is a view schematically showing an exemplary embodiment of a tiled display apparatus according to;

DETAILED DESCRIPTION

Figure 1:
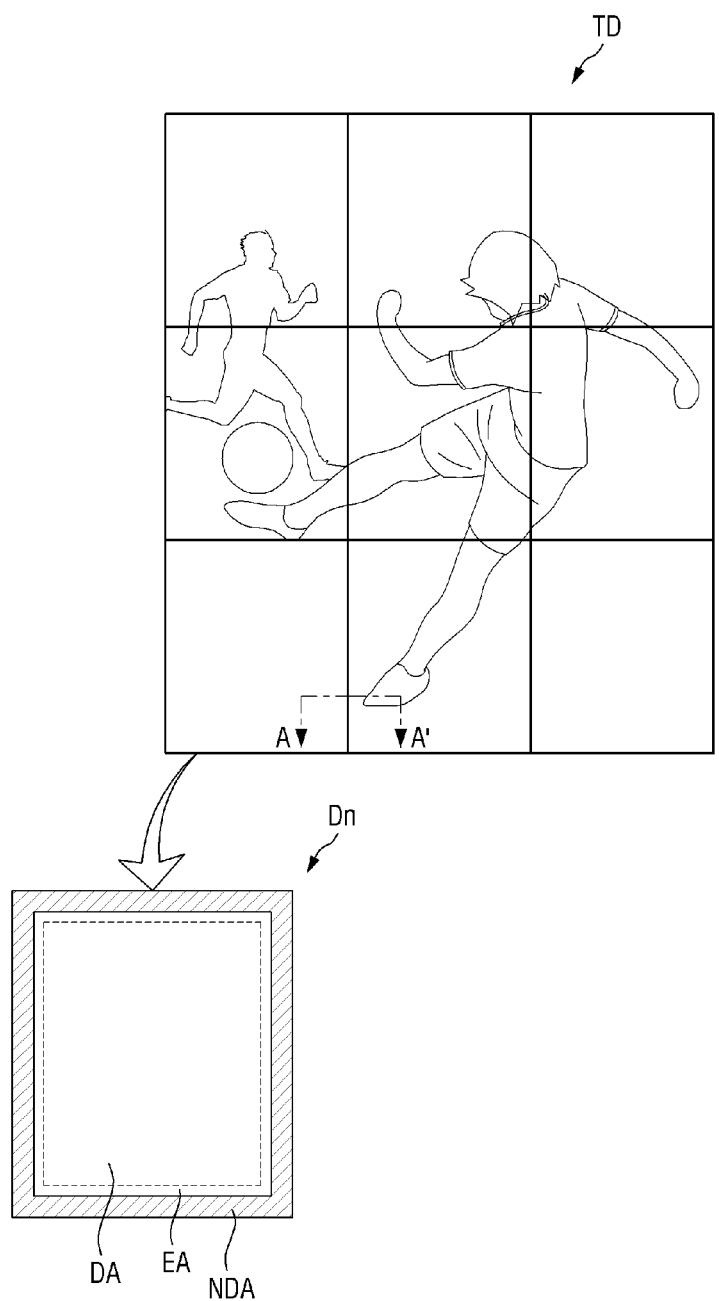

Features of the invention and methods of accomplishing the same may be understood more readily by reference to the following detailed description of embodiments and the accompanying drawings. The invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement.

Unless otherwise defined, all terms (including technical and scientific terms) used herein have the same meaning as commonly understood by one of ordinary skill in the art to which the application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The same or similar parts throughout the specification are denoted by the same reference numerals.

Hereinafter, exemplary embodiments of the invention will be described with reference to the attached drawings.

Figure 2:
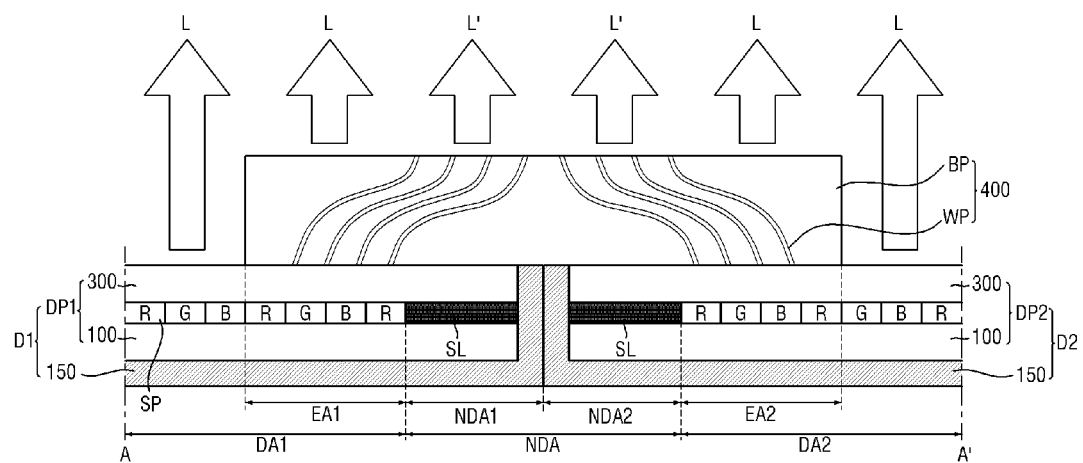
FIG. 2 is a cross-sectional view showing an exemplary embodiment taken along line A-A' in FIG. 1.
Figure 3:
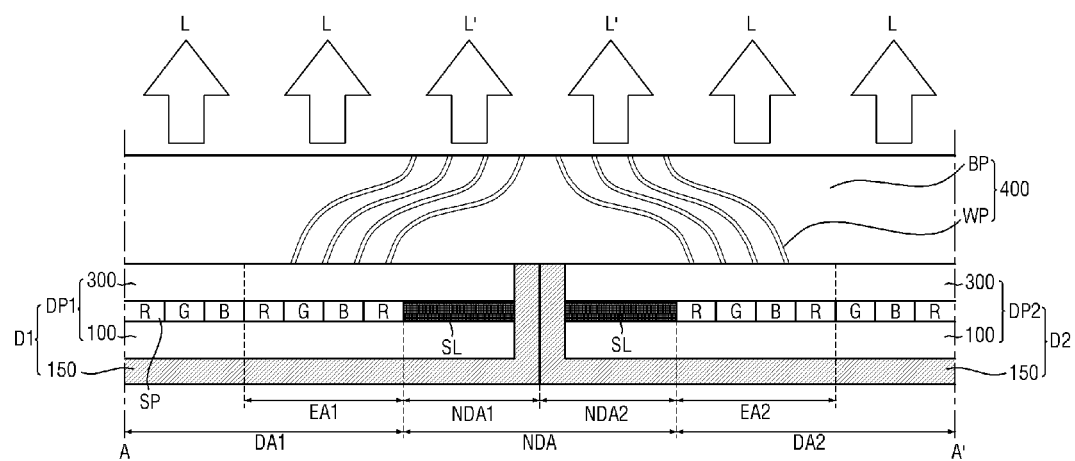
FIG. 3 is a cross-sectional view showing another exemplary embodiment taken along line A-A' in FIG. 1.

FIG. 1 is a view schematically showing an exemplary embodiment of a tiled display apparatus, FIG. 2 is a cross-sectional view showing an exemplary embodiment taken along line A-A' in FIG. 1, and FIG. 3 is a cross-sectional view showing another exemplary embodiment taken along line A-A' in FIG. 1.

Exemplary embodiments of display devices may be applied to large-sized electronic appliances such as televisions and external billboards, and small and middle-sized electronic appliances such as personal computers, notebook computers, car navigators, and cameras. Further, exemplary embodiments of display devices may be applied to electronic appliances such as tablet personal computers ("PCs"), smart phones, personal digital assistants ("PDAs"), portable multimedia players ("PMPs"), game machines, and watches. The above-mentioned electronic appliances are merely examples, and any other electronic appliances may also be employed.

Referring to FIG. 1, a tiled display apparatus TD may include a plurality of display devices Dn. Each of the plurality of display devices Dn may be a single complete display device Dn. In an exemplary embodiment, the plurality of display devices may include, but are not limited to, liquid crystal display devices ("LCDs") and light emitting diode display devices ("OLEDs"), for example. Hereinafter, the display device is exemplified as an LCD including a liquid crystal layer, but the invention is not limited thereto. In an exemplary embodiment, when a display device (e.g., an OLED) other than an LCD is employed, some components to be described below may be omitted, or other components not described may be added, for example.

In an exemplary embodiment, the plurality of display devices Dn may be arranged in a grid form, but the invention is not limited thereto. In an exemplary embodiment, the display devices Dn may be connected in a first direction, connected in a second direction, and connected to have a specific shape, for example, a stereoscopic shape, for example. The plurality of display devices Dn may have the same size as each other, but the invention is not limited thereto. The plurality of display devices Dn may have different sizes from each other.

In an exemplary embodiment, each of the plurality of display devices Dn included in the tiled display apparatus TD may have a rectangular shape including long sides and short sides, and the plurality of display devices Dn may be arranged such that long sides and short sides are connected to each other. Some of the display devices Dn may constitute one side of the tiled display apparatus TD, some of the display devices Dn may be disposed at the corner of the tiled display apparatus TD to constitute adjacent two sides of the tiled display apparatus TD, and some of the display devices Dn may be disposed inside the tiled display apparatus TD to be surrounded by other display devices Dn. The plurality of display devices Dn may have different bezel shapes or the same bezel shape depending on positions.

Each of the plurality of display devices Dn may include a display area DA where an image is outputted, and a non-display area NDA where a drive integrated circuit ("IC") or a printed circuit is provided and an image is not outputted. In an exemplary embodiment, the non-display area NDA of the display device Dn may be disposed on four sides of the display device Dn in the form of surrounding the outer periphery of the display area DA, but the invention is not limited thereto. The non-display area NDA may be disposed on at least one side of the display device Dn, and the non-display area NDA may be disposed differently depending on the position thereof in the display device TD. In an exemplary embodiment, when one display device Dn is disposed at the center of the tiled display apparatus TD and is thus connected to other display devices Dn on four sides thereof, the non-display area NDA may be disposed on the four sides thereof, for example. Further, when the display device Dn is disposed at the corner of the tiled display device TD and is thus connected to the two display devices Dn, the non-display area NDA may be disposed on only the two sides connected to the display device Dn.

The tiled display apparatus TD may have a flat shape, but the invention is not limited thereto. The tiled display device TD may have a stereoscopic shape to provide a stereoscopic effect. When the tiled display apparatus TD has a stereoscopic shape, each of the display devices Dn included in the tiled display apparatus TD may have a curved shape, and the display devices Dn each having a planar shape may be connected to each other at a predetermined angle so that the entire tiled display apparatus TD has a stereoscopic shape.

The plurality of display devices Dn may be connected to each other such that their non-display areas NDAs are in contact with each other, and may also be connected to each other through a connection member (not shown). Like this, since the tiled display apparatus TD is configured such that the plurality of display devices Dn is connected to each other and the non-display areas NDA of the display devices Dn are disposed in a double manner at the connection sites, the tiled display apparatus TD may be provided with an optical plate for expanding an image outputted from the display area DA to the upper portion of the non-display area NDA to prevent an image discontinuity phenomenon.

Referring to FIG. 2, in an exemplary embodiment, the tiled display apparatus TD includes a first display device D1 and a second display device D2, which are adjacent to each other, and an optical plate 400 disposed on the first display device D1 and the second display device D2.

The first display device D1 includes a first display panel DP1 including a plurality of sub-pixels SP, and a frame 150 surrounding the lower portion and side portion of the first display panel DP1. Although not shown in the drawings, a backlight unit (not shown) is disposed between the first display panel DP1 and the frame 150. The first display panel DP1 may include a first substrate 100 including a thin film transistor ("TFT") as a switching element for adjusting the light transmittance in each of the sub-pixels SP, a second substrate 300 including a color filter and/or a black matrix, a liquid crystal material layer (not shown) disposed between the first substrate 100 and the second substrate 300, and a sealant SL disposed outside the liquid crystal material layer. Although not shown in the drawings, a polarizing member is disposed outside the first substrate 100 and the second substrate 300.

The first display device D1 may include a first display area DA1 where an image is displayed, a first non-display area NDA1 where a drive IC or a printed circuit is provided and an image is not displayed, and a first edge area EA1, of the first display area DA1, adjacent to the first non-display area NDA1.

The second display device D2 includes a second display panel DP2 including a plurality of sub-pixels SP, and a frame 150 surrounding the lower portion and side portion of the second display panel DP2. In an exemplary embodiment, frames 150 respectively surrounding the first display panel DP1 and the second display panel DP2 are disposed, but the invention is not limited thereto. In another exemplary embodiment, one frame 150 surrounding the first display panel DP1 and the second display panel DP2 may also be disposed. A backlight unit (not shown) is disposed between the second display panel DP2 and the frame 150. The second display panel DP2 may include a first substrate 100 including a TFT as a switching element for adjusting the light transmittance in each of the sub-pixels SP, a second substrate 300 including a color filter and/or a black matrix, a liquid crystal material layer (not shown) disposed between the first substrate 100 and the second substrate 300, and a sealant SL disposed outside the liquid crystal material layer. Although not shown in the drawings, a polarizing member is disposed outside the first substrate 100 and the second substrate 300.

The second display device D2 may include a second display area DA2 where an image is displayed, a second non-display area NDA2 where a drive IC or a printed circuit is provided and an image is not displayed, and a second edge area EA2, of the second display area DA2, adjacent to the second non-display area NDA2.

The first display device D1 and the second display device D2 are connected to each other to constitute a part of the tiled display apparatus TD, and a non-display area NDA including the first non-display area NDA1 and the second non-display area NDA2 is disposed at a portion where the first display device D1 and the second display device D2 are connected to each other.

An optical plate 400 is disposed on the first display device D1 and the second display device D2. In an exemplary embodiment, the optical plate 400 may be disposed on the upper surface of the first display device D1 and the upper surface of the second display device D2 respectively corresponding the first edge area EA1 and first non-display area NDA1 of the first display device D1 and the second edge area EA2 and second non-display area NDA2 of the second display device D2. Although it shown in the drawing that the optical plate 400 is disposed over the area where the first display device D1 and the second display device D2 are in contact with each other, the invention is not limited thereto. In another exemplary embodiment, an optical plate 400 may be disposed on the upper surface of the first display device D1 corresponding to the first edge area EA1 and first non-display area NDA1 of the first display device D1, and another optical plate 400 may be disposed on the upper surface of the second display device D2 corresponding to the second edge area EA2 and second non-display area NDA2 of the second display device D2, for example.

The optical plate 400 may include a body portion BP and an optical waveguide WP. The body portion BP and the optical waveguide WP may have different refractive indices from each other. In an exemplary embodiment, the refractive index of the optical waveguide WP may be higher than the refractive index of the body portion BP. In an exemplary embodiment, the refractive index of the body portion BP may be about 1.4 to about 1.6, for example, and the refractive index of the optical waveguide WP may be higher than the refractive index of the body portion BP by about 0.002 to about 0.2, for example. Thus, the light L inputted to the optical waveguide WP may be totally reflected in the optical waveguide WP depending on the difference in refractive index between the body portion BP and the optical waveguide WP. In an exemplary embodiment, the optical plate 400 may include a body portion BP including a glass material and an optical waveguide WP including a glass material. In this case, the optical waveguide WP having a higher refractive index than that of the body portion BP may be disposed by increasing the density of the optical waveguide WP through femtosecond laser processing. When the body portion BP including a glass material and the optical waveguide WP including a glass material are provided, there is an advantage that image distortion does not occur even when an image outputted from the display device Dn passes through the optical plate 400 including the body portion BP and optical waveguide WP having different refractive indices from each other. However, the invention is not limited thereto. In another exemplary embodiment of an optical plate 400 may include a body portion BP including a glass material and an optical waveguide WP including an optical fiber, and an optical plate 400 according to still another exemplary embodiment may include a body portion BP including a resin and an optical waveguide WP including an optical fiber, for example.

The optical waveguide WP may output the light L outputted from the first edge area EA1 and the second edge area EA2 to the first non-display area NDA1 and the second non-display area NDA2. That is, a part of the light L outputted from the first edge area EA1 and the second edge area EA2 directly passes through the optical plate 400 and is outputted upward from the first edge area EA1 and the second edge area EA2, and another part of the light L is totally reflected in the optical waveguide WP and outputted upward from the first non-display area NDA1 and the second non-display area NDA2, thereby preventing an image discontinuity phenomenon occurring in the non-display area NDA of the tiled display apparatus TD. The movement of light through the optical plate 400 will be described later in detail.

Referring to FIG. 3, another exemplary embodiment of an optical plate 400 may be disposed on the entire surface of the first display device D1 and the second display device D2. In this case, the optical waveguide WP of the optical plate 400 may be disposed only on the upper surface of the first display device D1 and the upper surface of the second display device D2 respectively corresponding to the first edge area EA1 and first non-display area NDA1 of the first display device D1 and the second edge area EA2 and second non-display area NDA2 of the second display device D2. Although it is shown in FIG. 3 that the thickness of the optical plate 400 is the same throughout the entire area, the invention is not limited thereto, and the thickness of the optical plate 400 may not be the same in the region where the optical waveguide WP is disposed and the region where the body portion BP is disposed. In an exemplary embodiment, the thickness of the optical plate 400 may be provided to be less in the region where the body portion BP is disposed than that in the region where the optical waveguide WP is disposed, and the thickness of the optical plate 400 may also be provided to be less in the region where the optical waveguide WP is disposed than that in the region where the body portion BP is disposed, for example.

When the optical plate 400 is disposed on the entire surface of the first display device D1 and the second display device D2, considering that the body portion BP of the optical plate 400 is disposed in most of the first and second display areas DA1 and DA2 excluding the first edge area EA1 and the second edge area EA2, it is preferable that the thickness of the optical plate 400 is provided to be thin in the region where the body portion BP is disposed. In addition, considering that a sufficient movement path of the light L is desired to output the light outputted from the first edge area EA1 and the second edge area EA2 upward from the first non-display area NDA1 and the second non-display area NDA2, it is preferable that the thickness of the optical plate 400 is provided to be greater in the region where the optical waveguide WP is disposed than that in the region where the body portion BP is disposed.

Figure 4:
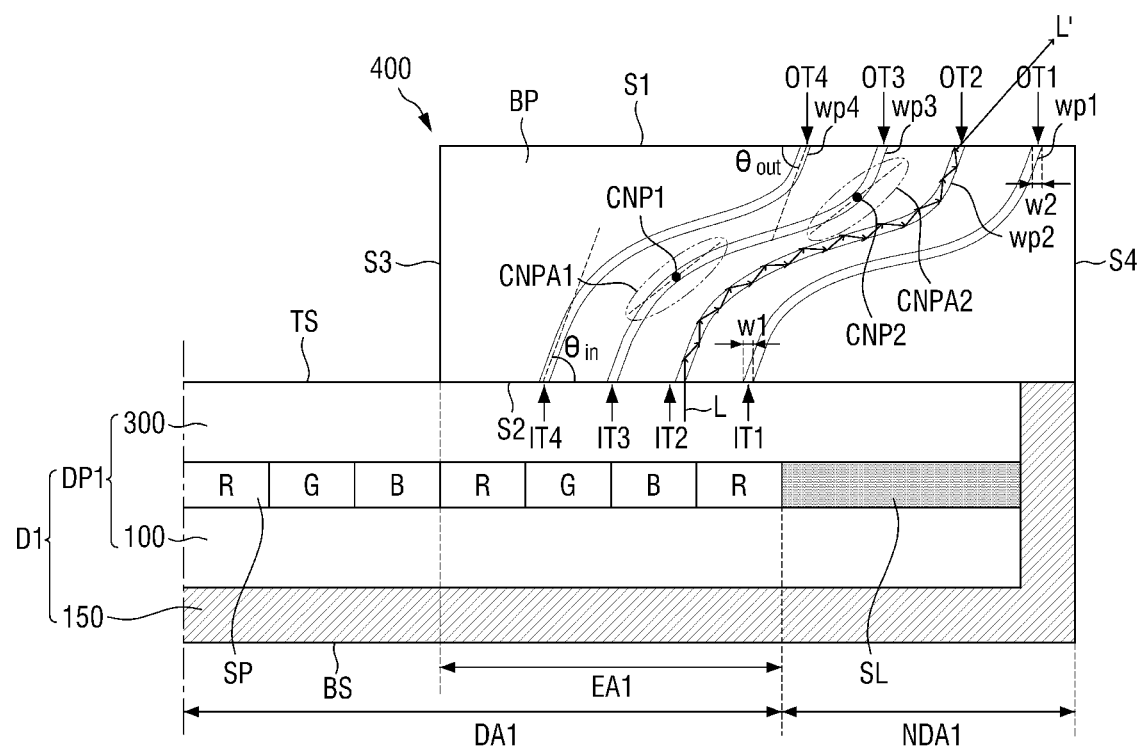
FIG. 4 is a cross-sectional view showing an exemplary embodiment of a part of first display device and a part of an optical plate.

FIG. 4 is a cross-sectional view showing an exemplary embodiment of a part of a first display device and a part of an optical plate.

Referring to FIG. 4, an exemplary embodiment of the tiled display apparatus TD includes a first display device D1 and an optical plate 400 disposed on a top surface TS of the first display device D1 which is opposite to a bottom surface BS of the first display device D1.

The optical plate 400 may have a rectangular cross-section including a first surface S1 that is an upper surface from which light is outputted, a second surface S2 disposed between the first surface S1 and the first display device D1, a third surface S3 that is a side surface connecting the first surface S1 and the second surface S2 and disposed on the first display area DA1 of the first display device D1, and a fourth surface S4 that is a side surface connecting the first surface S1 and the second surface S2 and disposed on the first non-display area NDA1 of the first display device D1. However, the invention is not limited thereto, and the optical plate 400 may have cross-sections having various shapes such as a trapezoidal shape and a triangular shape. When the tiled display device TD has a stereoscopic shape, the optical plate 400 may have a curved shape depending on the shape of the connection portion of the display device TD.

The optical plate 400 includes a body portion BP and a plurality of optical waveguides WP1, WP2, WP3, and WP4. In an exemplary embodiment, the plurality of optical waveguides WP may include a first optical waveguide WP1, a second optical waveguide WP2, a third optical waveguide WP3, and a fourth optical waveguide WP4. However, the invention is not limited thereto, and the number of optical guides may be changed depending on the size or the like of the display device TD and the non-display area NDA. In an exemplary embodiment, the first optical waveguide WP1, the second optical waveguide WP2, the third optical waveguide WP3, and the fourth optical waveguide WP4 are sequentially arranged in order closer to the first non-display area NDA1.

The first optical waveguide WP1 includes a first input terminal IT1 which is disposed on the second surface S2 of the optical plate 400 and to which light L outputted from the first edge area EA1 of the first display device D1 is inputted, and a first output terminal OT1 which is disposed on the first surface S1 of the optical plate 400 and through which light L' is outputted upward from the first non-display area NDA1 of the first display device D1. The second optical waveguide WP2 includes a second input terminal IT2 which is disposed on the second surface S2 of the optical plate 400 and to which light L outputted from the first edge area EA1 of the first display device D1 is inputted, and a second output terminal OT2 which is disposed on the first surface S1 of the optical plate 400 and through which light L' is outputted upward from the first non-display area NDA1 of the first display device D1. The third optical waveguide WP3 includes a third input terminal IT3 which is disposed on the second surface S2 of the optical plate 400 and to which light L outputted from the first edge area EA1 of the first display device D1 is inputted, and a third output terminal OT3 which is disposed on the first surface S1 of the optical plate 400 and through which light L' is outputted upward from the first non-display area NDA1 of the first display device D1. The fourth optical waveguide WP4 includes a fourth input terminal IT4 which is disposed on the second surface S2 of the optical plate 400 and to which light L outputted from the first edge area EA1 of the first display device D1 is inputted, and a fourth output terminal OT4 which is disposed on the first surface S1 of the optical plate 400 and through which light L' is outputted upward from the first non-display area NDA1 of the first display device D1.

Each of the first input terminal IT1, the second input terminal IT2, the third input terminal IT3, and the fourth input terminal IT4 is disposed on the first display area DA1 of the first display device D1, and each of the first output terminal OT1, the second output terminal OT2, the third output terminal OT3, and the fourth output terminal OT4 is disposed above the first non-display area NDA1 of the first display device D1. At least one of the input terminals IT1, IT2, IT3, and IT4 may be disposed in each of the sub-pixels SP of the first display device D1. In an exemplary embodiment, the width W1 of each of the first to fourth input terminals IT1, IT2, IT3 and IT4 may be about 10 micrometers (μm) to about 50 μm, and the width W2 of each of the first to fourth output terminals OT1, OT2, OT3 and OT4 may be about 10 μm to about 50 μm, for example.

In an exemplary embodiment, the width W1 of the first input terminal IT1 of the first optical waveguide WP1 may be the same as the width W2 of the first output terminal OT1 of the first optical waveguide WP1. That is, the width W1 of the first input terminal IT1 and the width W2 of the first output terminal OT1 of the first optical waveguide WP1 may be set to be the same in the range of about 10 μm to about 50 μm, for example, and the entire width of the first optical waveguide WP1 may be uniformly disposed to total reflection efficiency. The width W1 of the second input terminal IT2 of the second optical waveguide WP2 may be the same as the width W2 of the second output terminal OT2 of the second optical waveguide WP2. That is, the width W1 of the second input terminal IT2 and the width W2 of the second output terminal OT2 of the second optical waveguide WP2 may be set to be the same in the range of about 10 μm to about 50 μm, for example, and the entire width of the second optical waveguide WP2 may be uniformly disposed. The width W1 of the third input terminal IT3 of the third optical waveguide WP3 may be the same as the width W2 of the third output terminal OT3 of the third optical waveguide WP3. That is, the width W1 of the third input terminal IT3 and the width W2 of the third output terminal OT3 of the third optical waveguide WP3 may be set to be the same in the range of about 10 μm to about 50 μm, for example, and the entire width of the third optical waveguide WP3 may be uniformly disposed. The width W1 of the fourth input terminal IT4 of the fourth optical waveguide WP4 may be the same as the width W2 of the fourth output terminal OT4 of the fourth optical waveguide WP4. That is, the width W1 of the fourth input terminal IT4 and the width W2 of the fourth output terminal OT4 of the fourth optical waveguide WP4 may be set to be the same in the range of about 10 μm to about 50 μm, for example, and the entire width of the fourth optical waveguide WP4 may be uniformly disposed.

In an exemplary embodiment, the widths of the first to fourth optical waveguides WP1, WP2, WP3, and WP4 may be set to be the same as each other. However, the invention is not limited thereto, and the widths of the first to fourth optical waveguides WP1, WP2, WP3, and WP4 may be set to be different from each other. In an exemplary embodiment, the width may increase from the first optical waveguide WP1 to the fourth optical waveguide WP4, the width may decrease from the first optical waveguide WP1 to the fourth optical waveguide WP4, and some of the first to fourth optical waveguides WP1, WP2, WP3, and WP4 may have the same width and others thereof may have different widths, for example.

Each of the first to fourth optical waveguides WP1, WP2, WP3, and WP4 may have inflection points. In an exemplary embodiment, each of the first to fourth optical waveguides WP1, WP2, WP3, and WP4 may include a first inflection point CNP1 and a second inflection point CNP2. The first inflection point CNP1 may be an inflection point close to the first to fourth input terminals IT1, IT2, IT3 and IT4, and the second inflection point CNP2 may be an inflection point close to the first to fourth output terminals OT1, OT2, OT3 and OT4. Each of the first to fourth optical waveguides WP1, WP2, WP3, and WP4 includes a first inflection area CNPA1 defined as an area adjacent to the first inflection point CNP1 and a second inflection area CNPA2 defined as an area adjacent to the second inflection point CNP2. The first inflection area CNPA1 and the second inflection area CNPA2 may be curved areas curved convexly in different directions from each other. In an exemplary embodiment, the first inflection area CNPA1 may be a curved area that is convex in the direction of the first and third surfaces S1 and S3 of the optical plate 400, and the second inflection area CNPA2 may be a curved area that is convex in the direction of the second and fourth surfaces S2 and S4 of the optical plate 400, for example. Like this, since each of the first to fourth optical waveguides WP1, WP2, WP3, and WP4 has the first inflection area CNPA1 and the second inflection area CNPA2, which are curved convexly in different directions, the light L inputted to the first to fourth input terminals IT1, IT2, IT3, and IT4 may be effectively induced to the first to fourth output terminals OT1, OT2, OT3, and OT4.

The curvature of the first inflection area CNPA1 may be the same with the curvature of the second inflection area CNPA2, but the invention is not limited thereto. In another exemplary embodiment, the curvature of the first inflection area CNPA1 may be different from the curvature of the second inflection area CNPA2. The length of the first inflection area CNPA1 may be the same as the length of the second inflection area CNPA2. However, the invention is not limited thereto. In another exemplary embodiment, the length of the first inflection area CNPA1 may be different from the length of the second inflection area CNPA2 depending on the size of the bezel and the distance between the input terminal and output terminal of the optical waveguide WP. Like this, since the first inflection area CNPA1 adjacent to the first to fourth input terminals IT1, IT2, IT3, and IT4 is a curved area convex in the direction of the first and third surfaces S1 and S3, the incident angle $\theta_{in}$ at which the light L is inputted to the first to fourth input terminals IT1, IT2, IT3 and IT4 of the first to fourth optical waveguides WP1, WP2, WP3 and WP4 increases, and thus the light L' outputted from the first display device D1 may be effectively inputted to the first to fourth input terminals IT1, IT2, IT3 and IT4 of the first to fourth optical waveguides WP1, WP2, WP3 and WP4. Further, since the second inflection area CNPA2 adjacent to the first to fourth output terminals OT1, OT2, OT3, and OT4 is a curved area convex in the direction of the second and fourth surfaces S2 and S4, the outgoing angle ° out at which the light L' is outputted to the first to fourth output terminals OT1, OT2, OT3, and OT4 of the first to fourth optical waveguides WP1, WP2, WP3 and WP4 increases, and thus the light L' may be effectively outputted through the first to fourth output terminals OT1, OT2, OT3, and OT4 of the first to fourth optical waveguides WP1, WP2, WP3 and WP4.

Figure 5:
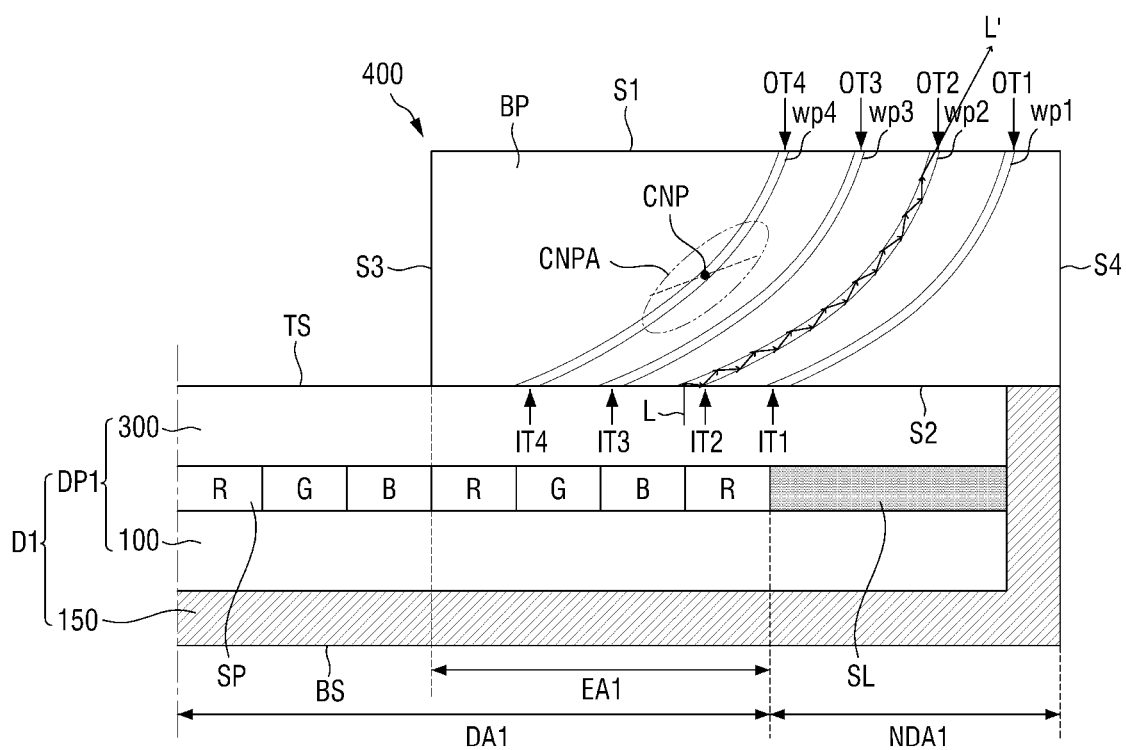
FIG. 5 is a cross-sectional view showing another exemplary embodiment of a part of a first display device and a part of an optical plate.
Figure 6:
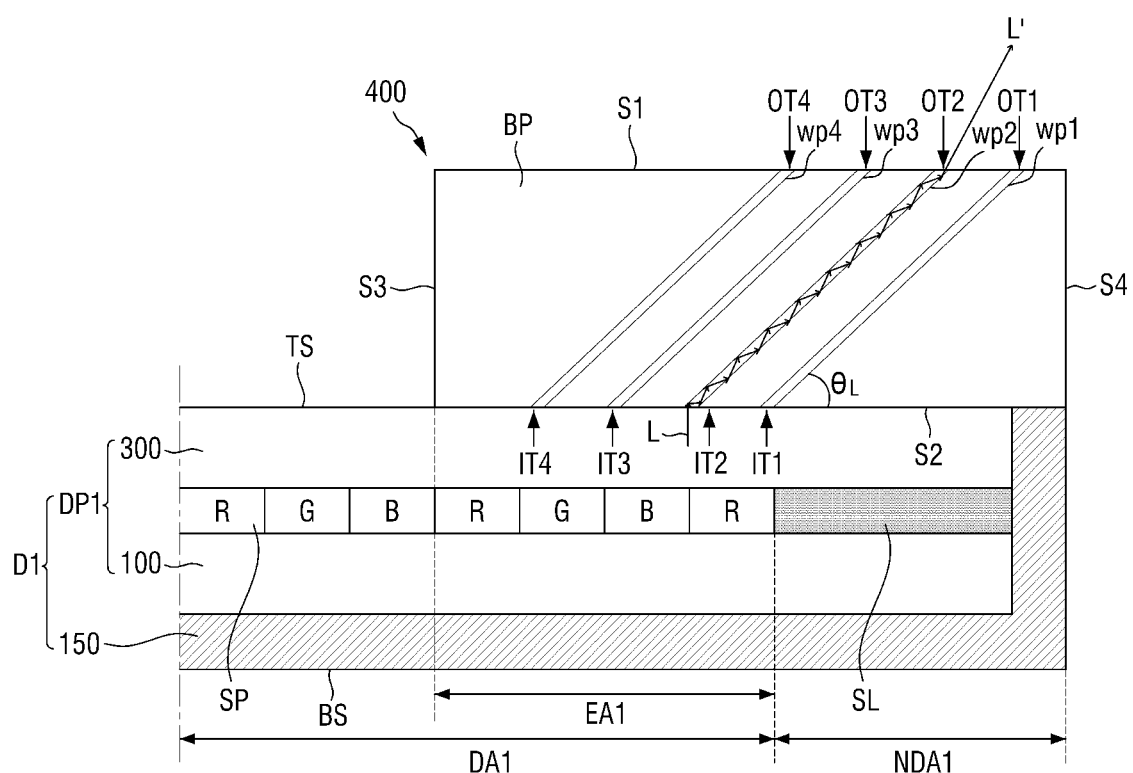
FIG. 6 is a cross-sectional view showing an exemplary embodiment of a part of a first display device and a part of an optical plate.

FIG. 5 is a cross-sectional view showing another exemplary embodiment of a part of a first display device and a part of an optical plate, and FIG. 6 is a cross-sectional view showing another exemplary embodiment of a part of a first display device and a part of an optical plate.

Exemplary embodiments of FIGS. 5 and 6 are different from the exemplary embodiment shown in FIG. 4 in the shape of the optical waveguide WP included in the optical plate 400. In FIGS. 5 and 6, a description overlapping with the exemplary embodiment shown in FIG. 4 will be omitted, and differences will be mainly described.

Referring to FIG. 5, each of the first to fourth waveguides WP1, WP2, WP3, and WP4 of another exemplary embodiment of a tiled display apparatus TD may have an inflection point. Each of the first to fourth waveguides WP1, WP2, WP3, and WP4 may have one inflection point CNP. In an exemplary embodiment, the inflection point CNP may be disposed at the center of each of the first to fourth waveguides WP1, WP2, WP3, and WP4. However, the invention is not limited thereto, and the inflection point CNP may be disposed close to the first to fourth input terminals IT1, IT2, IT3 and IT4, and may also be disposed close to the first to fourth output terminals OT1, OT2, OT3 and OT4.

In an exemplary embodiment, the inflection points CNP of the respective first to fourth optical waveguides WP1, WP2, WP3 and WP4 may be arranged at the same height from the second surface S2, but the invention is not limited thereto, the inflection points CNP thereof may be arranged at different heights from each other. In an exemplary embodiment, the height of the inflection point CNP may increase from the first optical waveguide WP1 to the fourth optical waveguide WP4, the height of the inflection point CNP may decrease from the first optical waveguide WP1 to the fourth optical waveguide WP4, and some of the first to fourth optical waveguides WP1, WP2, WP3, and WP4 may have the inflection points CNPs of the same height and others thereof may have the inflection points CNPs of different heights, for example.

Each of the first to fourth optical waveguides WP1, WP2, WP3, and WP4 includes an inflection area CNPA defined as an area adjacent to the inflection point CNP. The inflection area CNPA may be a curved area convex in the direction of the second and fourth surfaces S2 and S4 of the optical plate 400. Since the inflection area CNPA is a curved area convex in the direction of the second and fourth surfaces S2 and S4, the outgoing angle $\theta_{out}$ at which the light L' is outputted to the first to fourth output terminals OT1, OT2, OT3, and OT4 of the first to fourth optical waveguides WP1, WP2, WP3 and WP4 further increases, and thus the light L' may be effectively outputted through the first to fourth output terminals OT1, OT2, OT3, and OT4 of the first to fourth optical waveguides WP1, WP2, WP3 and WP4.

Referring to FIG. 6, each of the first to fourth waveguides WP1, WP2, WP3 and WP4 of another exemplary embodiment of a tiled display apparatus TD may have a linear shape without an inflection point. That is, each of the first to fourth waveguides WP1, WP2, WP3, and WP4 may have a linear shape in which each of the first to fourth input terminals IT1, IT2, IT3, and IT4 disposed on the first edge area EA1 is connected to each of the first to fourth output terminals OT1, OT2, OT3, and OT4 disposed above the first non-display area NDA1. Each of the first to fourth waveguides WP1, WP2, WP3, and WP4 may have a first angle $\theta_L$ with respect to the second surface S2 of the optical plate 400. In an exemplary embodiment, the first angles $\theta_L$ of the first to fourth optical waveguides WP1, WP2, WP3, and WP4 may be the same. However, the invention is not limited thereto, and the first angles $\theta_L$ of the first to fourth optical waveguides WP1, WP2, WP3, and WP4 may be different from each other. In an exemplary embodiment, the first angle $\theta_L$ may increase from the first optical waveguide WP1 to the fourth optical waveguide WP4, the first angle $\theta_L$ may decrease from the first optical waveguide WP1 to the fourth optical waveguide WP4, and some of the first to fourth waveguides WP1, WP2, WP3, and WP4 may have the same first angle $\theta_L$ and others thereof may have different first angles $\theta_L$ from each other, for example.

Since each of the first to fourth waveguides WP1, WP2, WP3, and WP4 may have a linear shape in which each of the first to fourth input terminals IT1, IT2, IT3, and IT4 disposed on the first edge area EA1 is connected to each of the first to fourth output terminals OT1, OT2, OT3, and OT4 disposed above the first non-display area NDA1, the light L inputted to each of the first to fourth input terminals IT1, IT2, IT3, and IT4 may be effectively totally reflected in the first to fourth waveguides WP1, WP2, WP3, and WP4.

Figure 7:
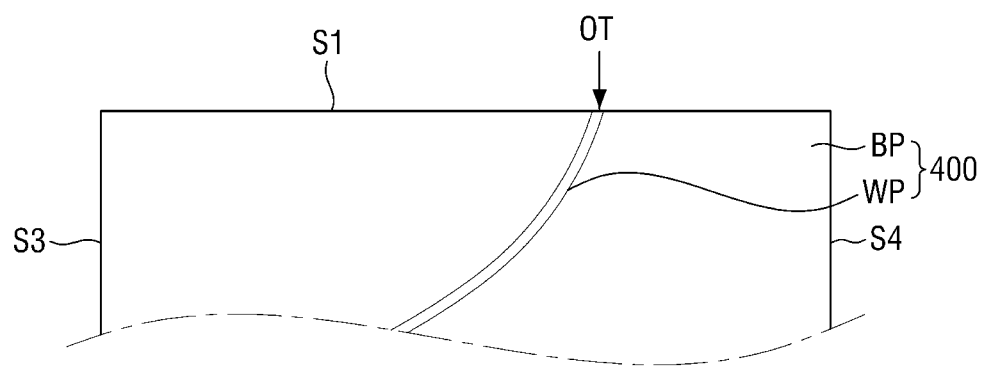
FIG. 7 is a cross-sectional view showing an exemplary embodiment of a part of an optical waveguide.
Figure 8:
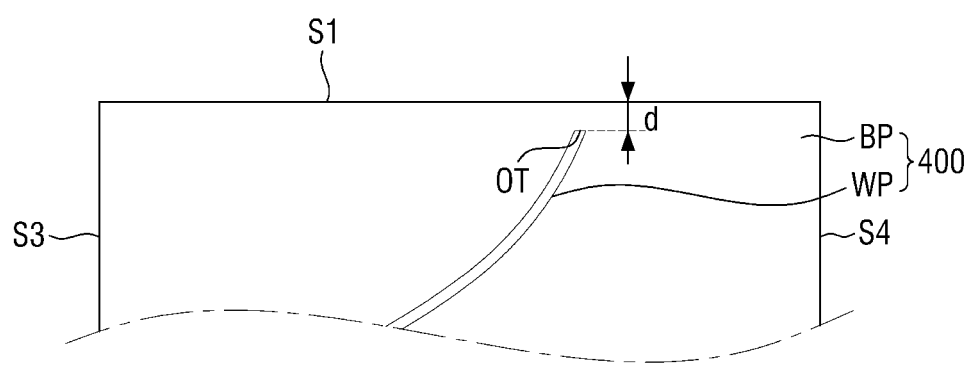
FIG. 8 is a cross-sectional view showing another exemplary embodiment of a part of an optical waveguide.

FIG. 7 is a cross-sectional view showing an exemplary embodiment of a part of an optical waveguide, and FIG. 8 is a cross-sectional view showing another exemplary embodiment of a part of an optical waveguide.

Referring to FIG. 7, in an exemplary embodiment, the output terminal OT of the optical waveguide WP may be exposed to the first surface S1 of the optical plate 400. In an exemplary embodiment, the output terminal OT of the optical waveguide WP may be disposed on the same line as the first surface S1 of the optical plate 400, for example. However, the invention is not limited thereto, and the output terminal OT of the optical waveguide WP may be disposed to protrude from the first surface S1 of the optical plate 400. In this case, the output terminal OT of the optical waveguide WP may be provided to have an inclined surface, and the inclined surface of the output terminal OT may be disposed toward the non-display area NDA of the display device Dn (refer to FIG. 1).

Referring to FIG. 8, in an exemplary embodiment, the output terminal OT of the optical waveguide WP may be provided to be embedded in the first surface S1 of the optical plate 400. In an exemplary embodiment, the output terminal OT of the optical waveguide WP may be disposed at a position lower than the first surface S1 of the optical plate 400, for example. In an exemplary embodiment, the output terminal OT of the optical waveguide WP may be disposed at a position lower by a distance d from about 0.01 millimeter (mm) to about 2 mm than the first surface S1 of the optical plate 400, for example. The upper portion of the output terminal OT of the optical waveguide WP is filled with the body portion BP of the optical plate 400, so that the first surface S1 of the optical plate 400 may be made flat. However, the invention is not limited thereto, and in another exemplary embodiment, the upper portion of the output terminal OT of the optical waveguide WP is opened, so that the first surface S1 of the optical plate 400 may have a structure in which a groove is defined corresponding to the output terminal OT of the optical waveguide WP. When the output terminal OT of the optical waveguide WP is disposed to be embedded in the first surface S1 of the optical plate 400, there is an advantage that breakage and deformation of the output terminal OT due to external force may be prevented.

When the optical plate is provided with a plurality of optical waveguides WP, the output terminal OT of each of the plurality of optical waveguides WP may be exposed as shown in FIG. 7, or may be embedded as shown in FIG. 8. However, the invention is not limited thereto, and some of the plurality of optical waveguides WP may be exposed and others thereof may be embedded.

Figure 9:
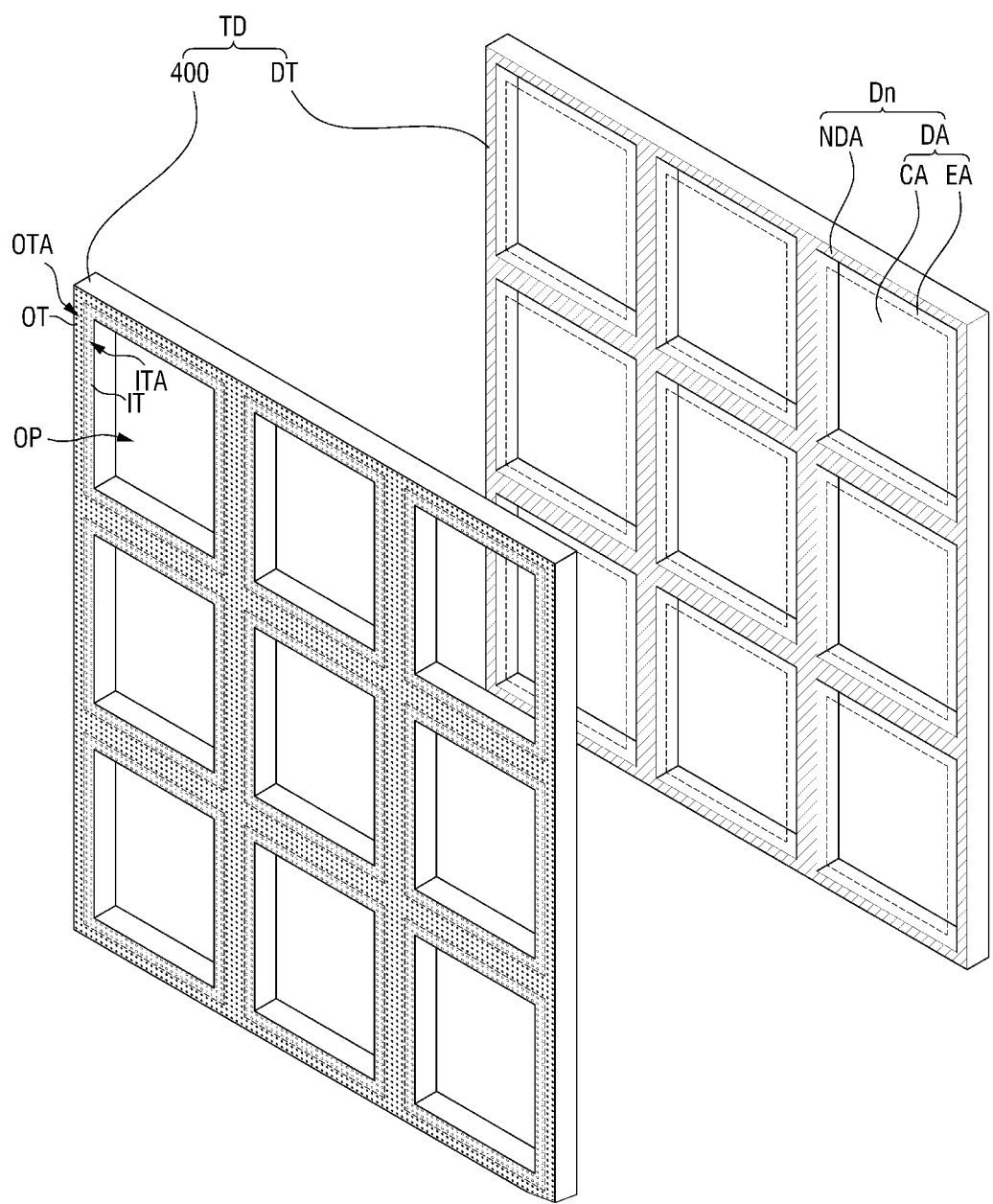
FIG. 9 is a perspective view schematically showing an exemplary embodiment of a tiled display apparatus.
Figure 10:
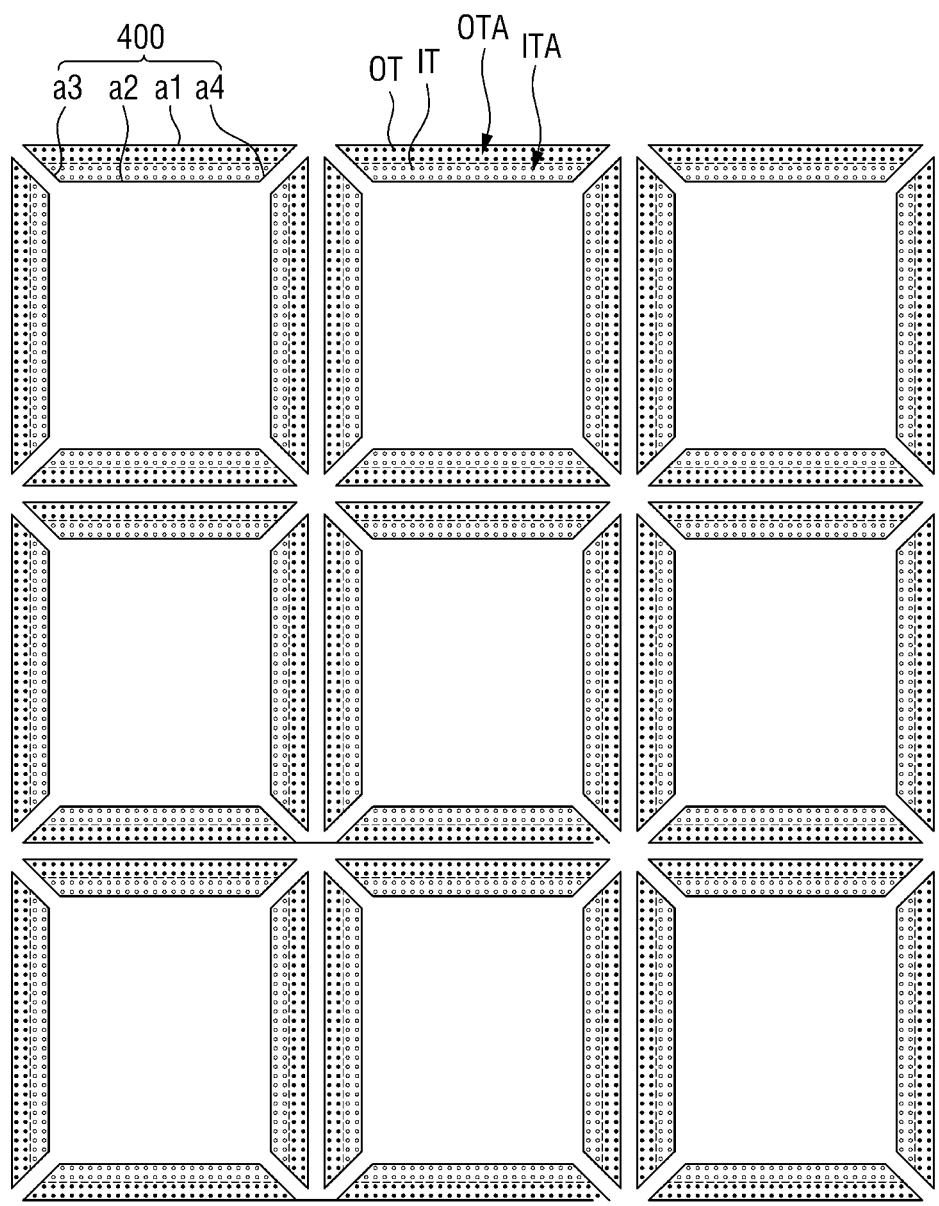
FIG. 10 is a view schematically showing another exemplary embodiment of a configuration of an optical plate.
Figure 11:
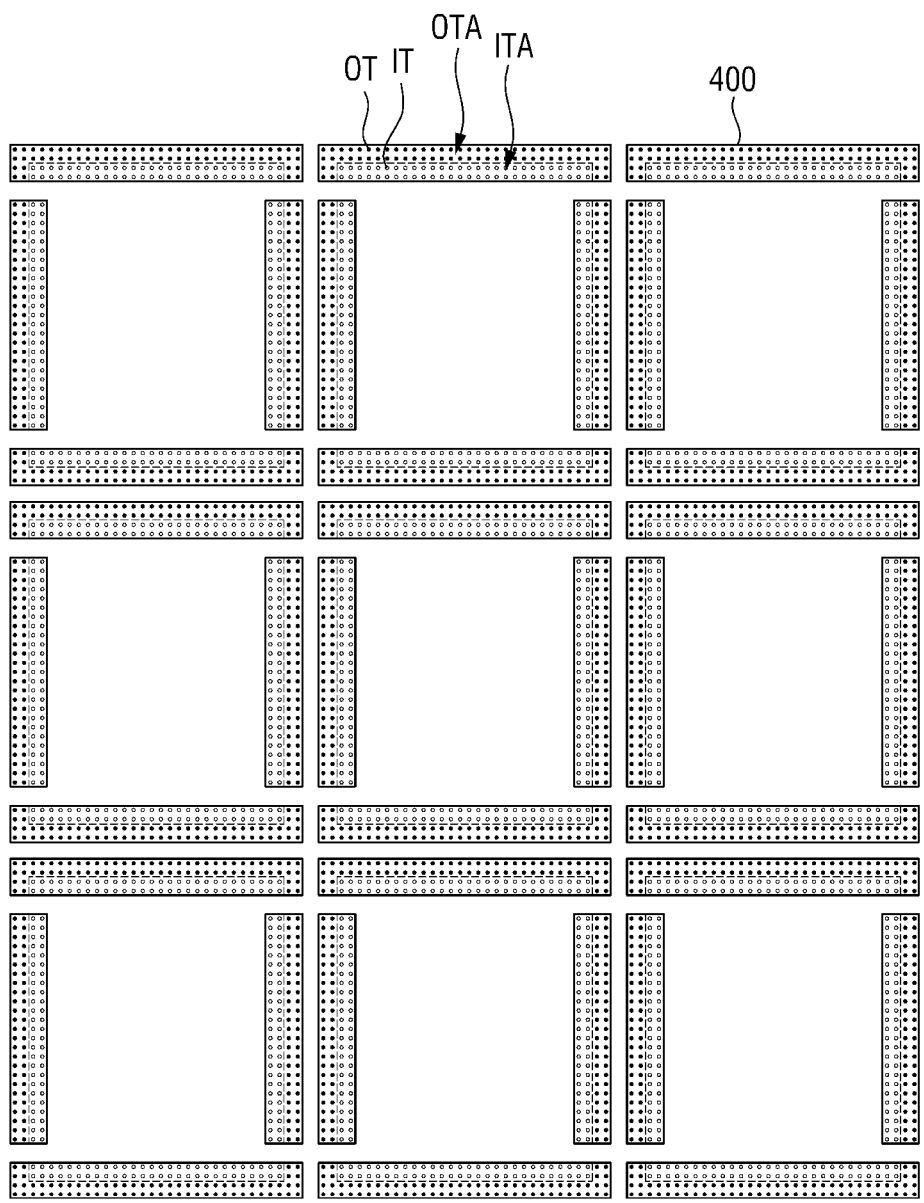
FIG. 11 is a view schematically showing another exemplary embodiment of a configuration of an optical plate.

FIG. 9 is a perspective view schematically showing an exemplary embodiment of a tiled display apparatus, FIG. 10 is a view schematically showing another exemplary embodiment of a configuration of an optical plate, and FIG. 11 is a view schematically showing a configuration of an optical plate according to still another exemplary embodiment.

Referring to FIG. 9, an exemplary embodiment of a tiled display apparatus TD may include a display device unit DT and an optical plate 400 disposed on the display device unit DT. The display device unit DT may include a plurality of display devices Dn arranged in a matrix form. Each of the plurality of display devices Dn may include a display area DA where an image is outputted, and a non-display area NDA where a drive IC or a printed circuit is provided and an image is not outputted. The display area DA may include an edge area EA and a central area CA.

A plurality of openings OP exposing the central areas CA of the plurality of display devices Dn may be defined in the optical plate 400, and the optical plate 400 may include input areas ITA corresponding to the edge areas EA of the plurality of display devices Dn, and output areas OTA corresponding to the non-display areas NDA of the plurality of display devices Dn. The image outputted from the central areas CA of the plurality of display devices Dn is directly outputted in the plurality of openings OP of the optical plate 400. The input area ITA of the optical plate 400 is an area to which an image outputted from the edge area EA of each of the plurality of display devices Dn is inputted, and the output area OTA of the optical plate 400 is an area in which an image is outputted upward from the non-display area NDA of each of the plurality of display devices Dn.

The optical plate 400 may be provided with a plurality of waveguides WP (refer to FIG. 4) each having an input terminal IT and an output terminal OT. The input area ITA of the optical plate 400 is provided with the input terminal IT of the optical waveguide WP (refer to FIG. 4), and the output area OTA of the optical plate 400 is provided with the output terminal OT of the optical waveguide WP (refer to FIG. 4). The cross-section of each of the input terminal IT and the output terminal OT may have a circular shape. However, the invention is not limited thereto, and the cross-section thereof may have various shapes such as a polygonal shape and an elliptical shape.

The light outputted from the edge area EA of each of the plurality of display devices Dn is inputted to the input area of the optical plate 400. A part of the light inputted to the input area of the optical plate 400 is inputted to the input terminal IT, is totally reflected in the optical waveguide WP (refer to FIG. 4), and is outputted to the output terminal OT disposed in the non-display area NDA. A residue of the light directly passes through the optical plate 400 and is outputted to the display area DA corresponding to the edge area EA. Thus, the light outputted from the edge area EA is expanded and outputted to the upper portion of the edge area EA and the upper portion of the non-display area NDA, so that an image discontinuity phenomenon due to the non-display area NDA is prevented, thereby ensuring the continuity of an image in the tiled display apparatus TD.

The optical plate 400, as shown in FIG. 9, may be an integrated optical plate in which a plurality of openings OP exposing the central areas CA of the plurality of display devices Dn is defined, and which includes input areas ITA corresponding to the edge areas EA of the plurality of display devices Dn, and output areas OTA corresponding to the non-display areas NDA of the plurality of display devices Dn. However, the invention is not limited thereto. In another exemplary embodiment, a plurality of optical plates 400 may be arranged independently.

Referring to FIGS. 10 and 11, another exemplary embodiment of an optical plate 400 may have a bar shape. The bar-shaped optical plate 400 may include an input area ITA and an output area OTA, and the plurality of the bar-shaped optical plates 400 may be independently arranged corresponding to the edge area EA and non-display area NDA of the tiled display apparatus TD. The bar-shaped optical plate 400 may have a trapezoidal shape including first to fourth surfaces a1, a2, a3, and a4 as shown in FIG. 10, and may also have a rectangular shape as shown in FIG. 11. However, the invention is not limited thereto. In other exemplary embodiments, the bar-shaped optical plate 400 may have various shapes such as a polygon and a circle. Like this, when the plurality of the bar-shaped optical plates 400 is independently arranged, the bar-shaped optical plates 400 may be selectively arranged in the areas each in which an image is disconnected in the tiled display apparatus TD, so that there are advantages that the freedom of design and the convenience of arrangement are provided and that this configuration may be easily applied to tiled display apparatuses of various shapes.

Figure 12:
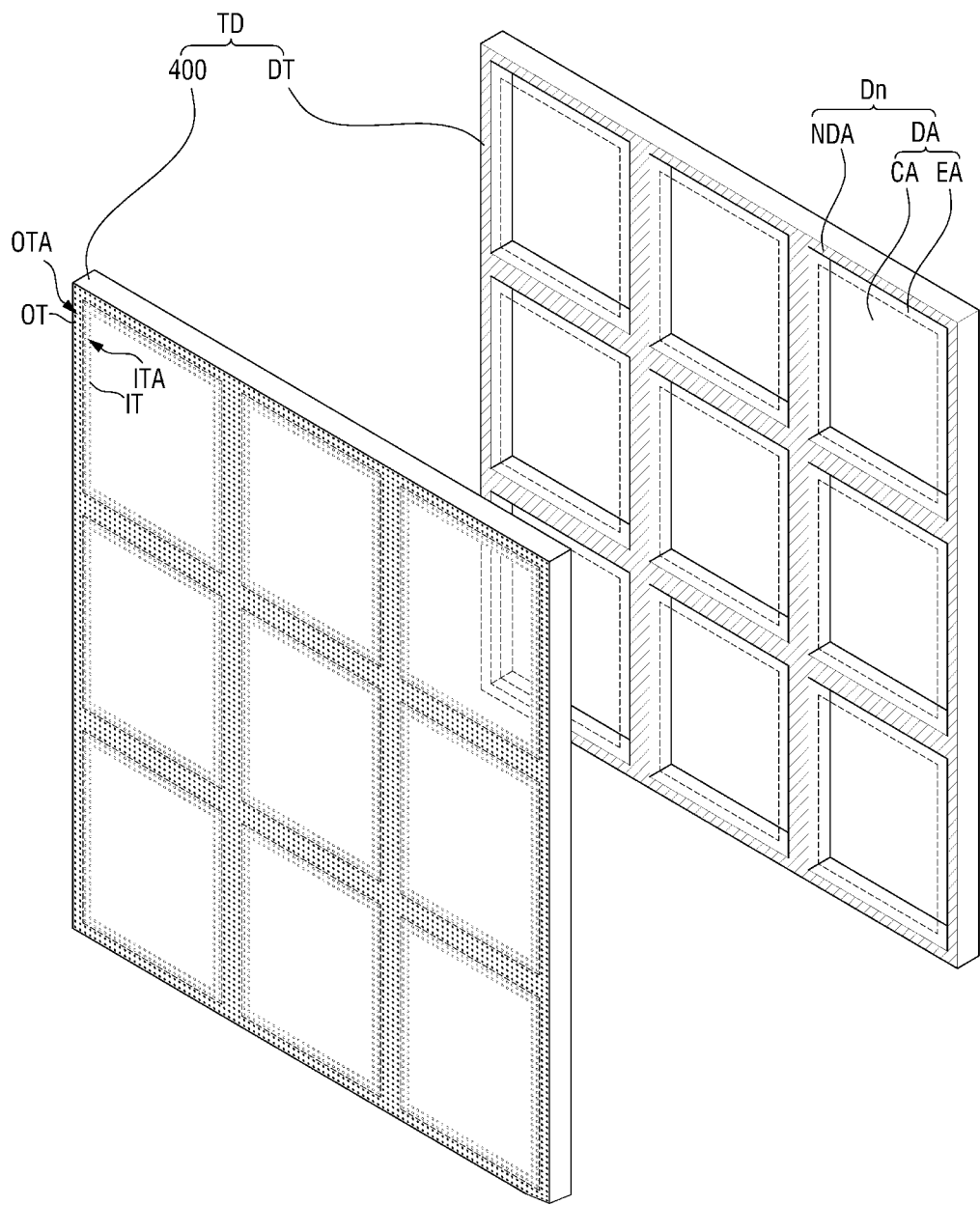
FIG. 12 is a schematic perspective view showing another exemplary embodiment of a tiled display apparatus.
Figure 13:
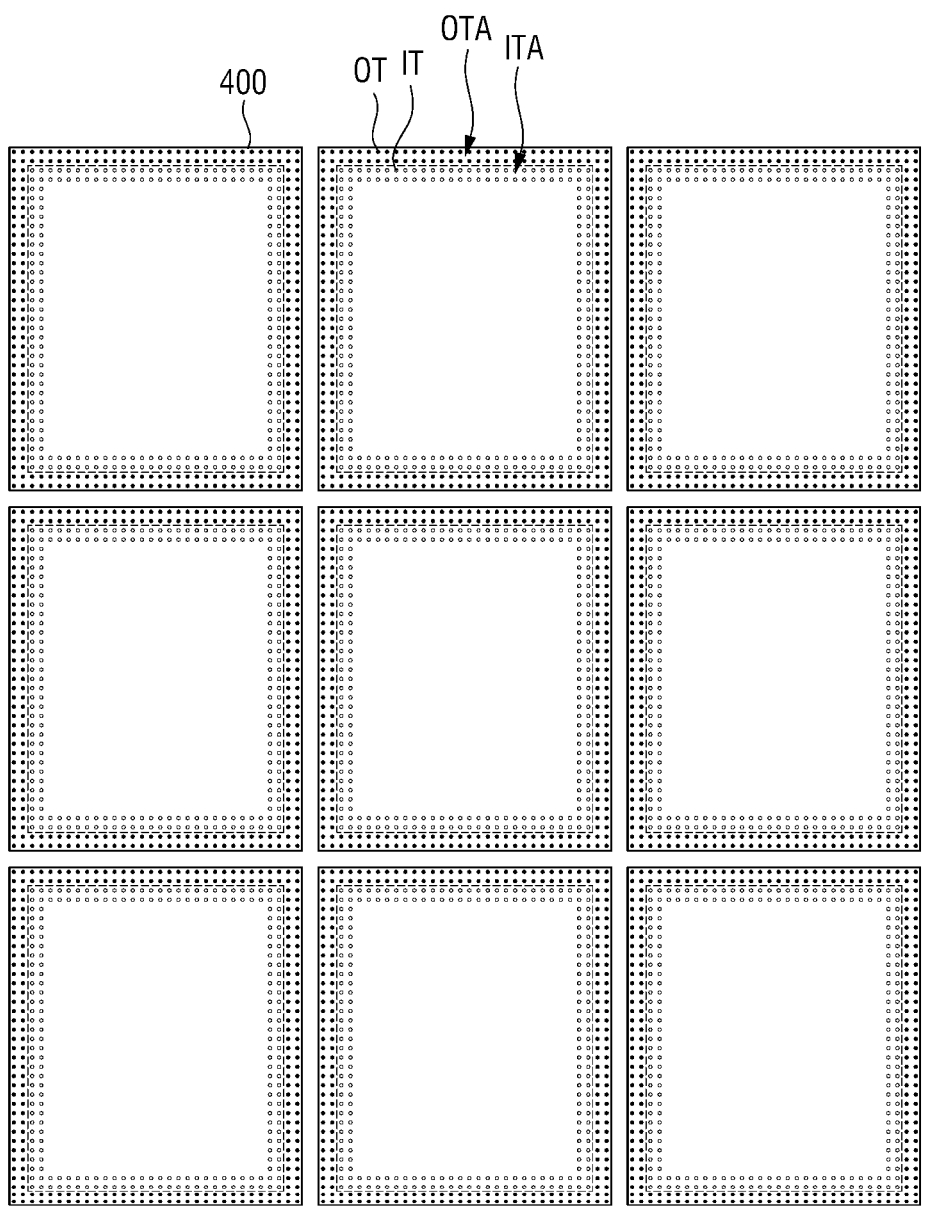
FIG. 13 is a view schematically showing still another exemplary embodiment of a configuration of an optical plate.

FIG. 12 is a schematic perspective view showing another exemplary embodiment of a tiled display apparatus, and FIG. 13 is a view schematically showing another exemplary embodiment of a configuration of an optical plate.

Another exemplary embodiment of the tiled display apparatus may include a display device unit DT and an optical plate 400 disposed on the display device unit DT. The optical plate 400 may be disposed over the front surface of the display device unit DT. The optical plate 400 may include an input area ITA and an output area OTA. The input area ITA of the optical plate 400 may be disposed corresponding to the edge area EA of each of the plurality of display devices Dn, and the output area OTA of the optical plate 400 may be disposed corresponding to the non-display area NDA of each of the plurality of display devices Dn. The optical waveguide WP (refer to FIG. 4) is located over the input area ITA and the output area OTA, and is not disposed in the central area CA of each of the plurality of display devices Dn. Thus, the light outputted from the central area CA of each of the plurality of display devices Dn directly passes through the optical plate 400 and is outputted, and the light outputted from the edge area EA is expanded and outputted to the upper portion of the edge area EA and the upper portion of the non-display area NDA, so that an image discontinuity phenomenon due to the non-display area NDA is prevented, thereby ensuring the continuity of an image in the tiled display apparatus TD.

Although it is shown in FIG. 12 that the thickness of the optical plate 400 is the same over the entire surface, the invention is not limited thereto. The thickness of the optical plate 400 may not be the same in an area corresponding to the upper portion of the edge area EA and the upper portion of the non-display area NDA of each of the plurality of display devices Dn and an area corresponding to the central area CA of each of the plurality of display devices Dn. In an exemplary embodiment, the thickness of the optical plate 400 may be less in an area corresponding to the central area CA of each of the plurality of display devices Dn than that in an area corresponding to the upper portion of the edge area EA and the upper portion of the non-display area NDA of each of the plurality of display devices Dn, for example. The optical plate 400 may be disposed unitarily in correspondence with the display unit DT, but the invention is not limited thereto. The optical plate 400 may be configured such that a plurality of optical plates corresponding to the respective display devices Dn are connected to each other as shown in FIG. 13.

Figure 14:
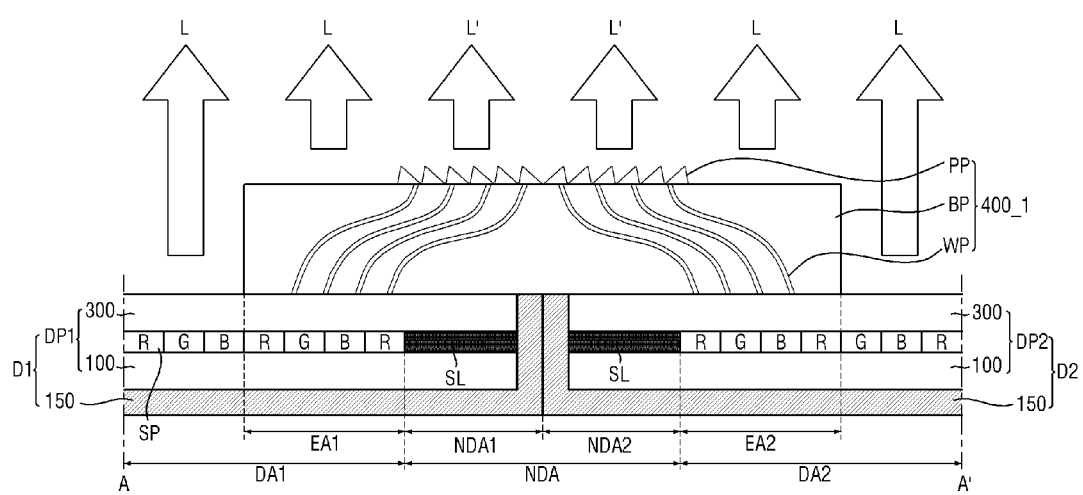
FIG. 14 is a cross-sectional view showing an exemplary embodiment taken along line A-A' in FIG. 1.
Figure 15:
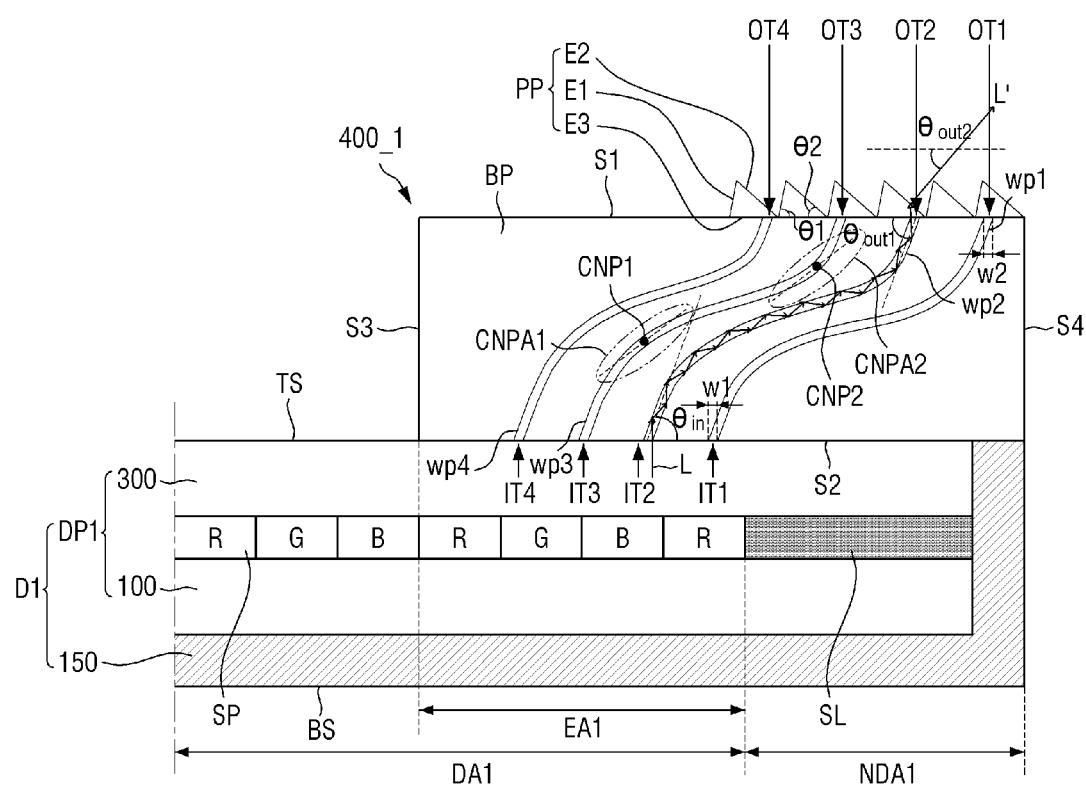
FIG. 15 is a cross-sectional view showing another exemplary embodiment of a part of a first display device and a part of an optical plate.
Figure 16:
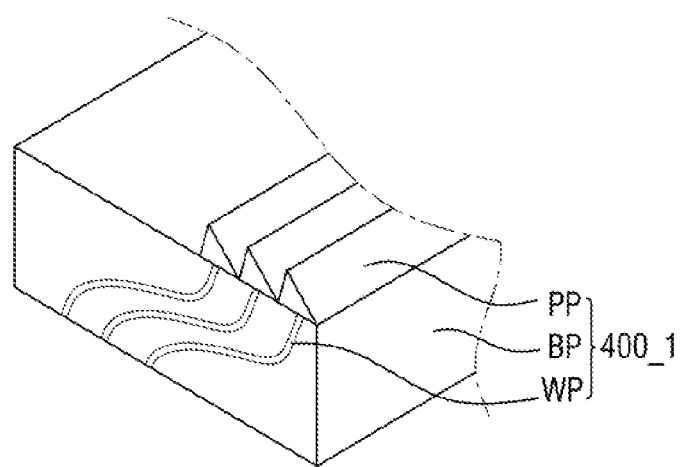
FIG. 16 is a perspective view showing another exemplary embodiment of a part of an optical plate.

FIG. 14 is a cross-sectional view showing another exemplary embodiment taken along line A-A' in FIG. 1, FIG. 15 is a cross-sectional view showing another exemplary embodiment of a part of a first display device and a part of an optical plate, and FIG. 16 is a perspective view showing another exemplary embodiment of a part of an optical plate.

Exemplary embodiments of FIGS. 14 to 16 are different from the exemplary embodiment shown in FIG. 2 in that an optical plate is provided with a prism pattern. In FIGS. 14 to 16, a description overlapping with the exemplary embodiment shown in FIG. 2 will be omitted, and differences will be mainly described.

Referring to FIG. 14, in another exemplary embodiment, the tiled display apparatus TD includes a first display device D1 and a second display device D2, which are adjacent to each other, and an optical plate 400_1 disposed on the first display device D1 and the second display device D2.

The optical plate 400_1 may include a body portion BP, an optical waveguide WP, and a prism pattern PP. The body portion BP and the optical waveguide WP may have different refractive indices from each other. In an exemplary embodiment, the refractive index of the optical waveguide WP may be higher than the refractive index of the body portion BP. In an exemplary embodiment, the refractive index of the optical waveguide WP may be higher than the refractive index of the body portion BP by about 0.002 to about 0.2, for example. Thus, the light L inputted to the optical waveguide WP may be totally reflected in the optical waveguide WP depending on the difference in refractive index between the body portion BP and the optical waveguide WP.

The refractive index of the prism pattern PP may be equal to or lower than the refractive index of the optical waveguide WP. Thus, the light L outputted from the optical waveguide WP and inputted to the prism pattern PP may be effectively refracted and outputted to the outside. The optical waveguide WP may advance the light L outputted from the first edge area EA1 and the second edge area EA2 upward from the first non-display area NDA1 and the second non-display area NDA2. That is, a part of the light L outputted from the first edge area EA1 and the second edge area EA2 directly passes through the optical plate 400_1 is outputted to the upper portion of the first and second display areas DA1 and DA2 respectively corresponding to the first edge area EA1 and the second edge area EA2, and a residue of the light L is totally reflected along the optical waveguide WP and is advanced upward from the first non-display area NDA1 and the second non-display area NDA2. The light outputted from the optical waveguide WP passes through the prism pattern PP disposed on the optical waveguide WP and is refracted and outputted upward from the first non-display area NDA1 and the second non-display area NDA2. Accordingly, the image continuity of the tiled display apparatus TD may be assured even when a user views a screen from a side surface, not a front surface.

More specifically, referring to FIGS. 15 and 16, a tiled display apparatus TD includes a first display device D1 and an optical plate 400_1 disposed on the first display device D1. The optical plate 400_1 includes a body portion BP, a plurality of optical waveguides WP, and a prism pattern PP provided on the first surface S1 of the optical plate 400_1.

The prism pattern PP may be disposed over the first non-display area NDA1 of the first display device D1. That is, first to fourth output terminals OT1, OT2, OT3, and OT4 of first to fourth waveguides WP1, WP2, WP3, and WP4 and a plurality of prism patterns PP may be disposed over the first non-display area NDA1 of the first display device D1.

In an exemplary embodiment, the prism pattern PP may include a lower surface E3 contacting the first surface S1 of the optical plate 400_1, and first and second inclined surfaces E1 and E2 connected to the lower surface E3. The first inclined surface E1 may be an inclined surface close to the first display area DA1 of the first display device D1, and the second inclined surface E2 may be an inclined surface close to the first non-display area NDA1 of the first display device D1. In another exemplary embodiment, the prism pattern PP may include a lower surface, a vertical surface, and an inclined surface. The vertical surface may be a surface close to the first display area DA1 of the first display device D1, and the inclined surface may be a surface close to the first non-display area NDA1 of the first display device D1.

In order to refract the light inputted from the first to fourth output terminals OT1, OT2, OT3, and OT4 of the first to fourth optical waveguides WP1, WP2, WP3, and WP4 upward from the first non-display area NDA1, in each of the plurality of prism patterns PP, the second acute angle $\theta2$ defined by the lower surface E3 and the second inclined surface E2 may be smaller than the first acute angle $\theta1$ defined by the lower surface E3 and the first inclined surface E1. The second acute angles $\theta2$, each defined by the lower surface E3 and second inclined surface E2 of each of the plurality of prism patterns PP, may be the same as each other. However, the invention is not limited thereto. The second acute angle $\theta2$ defined by the lower surface E3 and the second inclined surface E2 may increase from the first optical waveguide WP1 to the fourth optical waveguide WP4, the second acute angle $\theta2$ defined by the lower surface E3 and the second inclined surface E2 may decrease from the first optical waveguide WP1 to the fourth optical waveguide WP4, and some of the first to fourth optical waveguides WP1, WP2, WP3, and WP4 may have the same second acute angle $\theta2$ and others thereof may have different second acute angles $\theta2$.

In an exemplary embodiment, the length of the lower surface E3 of the prism pattern PP may be equal to or greater than the width W2 of the output terminal OT of the optical waveguide WP. In an exemplary embodiment, the length of the lower surface E3 of the prism pattern PP may be about 50 μm to about 200 μm, and the width W2 of the output terminal OT of the optical waveguide WP may be about 10 μm to about 50 μm, for example. In an exemplary embodiment, the height of the prism pattern PP may be about 50 μm to about 200 μm, for example, but is not limited thereto. In an exemplary embodiment, the plurality of prism patterns PP may have the same size, but the invention is not limited thereto, and the plurality of prism patterns PP may have different sizes from each other. In an exemplary embodiment, the size of the prism pattern may increase from the first optical waveguide WP1 to the fourth optical waveguide WP4, and the size of the prism pattern may decrease from the first optical waveguide WP1 to the fourth optical waveguide WP4, for example. In an exemplary embodiment, the plurality of prism patterns may be arranged to be connected to each other. However, the invention is not limited thereto, and the plurality of prism patterns may be arranged to be spaced apart from each other.

The first inflection area CNPA1 of the optical plate 400_1 includes a curved area convex in the direction of the first and third surfaces S1 and S3, so that the incident angle $\theta_{in}$ at each of the first to fourth input terminals IT1, IT2, IT3 and IT4 of the first to fourth optical waveguides WP1, WP2, WP3 and WP4 increases, and the light L outputted from the first display device D1 is effectively inputted to the first to fourth input terminals IT1, IT2, IT3 and IT4. When the outgoing angle $\theta_{out1}$ at each of the first to fourth output terminal OT1, OT2, OT3, and OT4 is small, the light L is not effectively outputted through the first to fourth output terminals OT1, OT2, OT3 and OT4, and is reflected into the optical plate 400_1. The second inflection area CNPA2 of the optical plate 400_1 includes a curved area convex in the direction of the second and fourth surfaces S2 and S4, so that the outgoing angle Nut' at each of the first to fourth output terminal OT1, OT2, OT3, and OT4 increases, and the light L is effectively outputted through the first to fourth output terminal OT1, OT2, OT3, and OT4. Further, the light L outputted through the first to fourth output terminal OT1, OT2, OT3, and OT4 passes through the plurality of prism patterns PP disposed on the first to fourth output terminal OT1, OT2, OT3, and OT4 to decrease the outgoing angle $\theta_{out2}$, and thus the light L' is refracted and outputted upward from the non-display area NDA1. Accordingly, the image continuity of the tiled display apparatus TD may be assured even when a user views a screen from a side surface, not a front surface.

Figure 17:
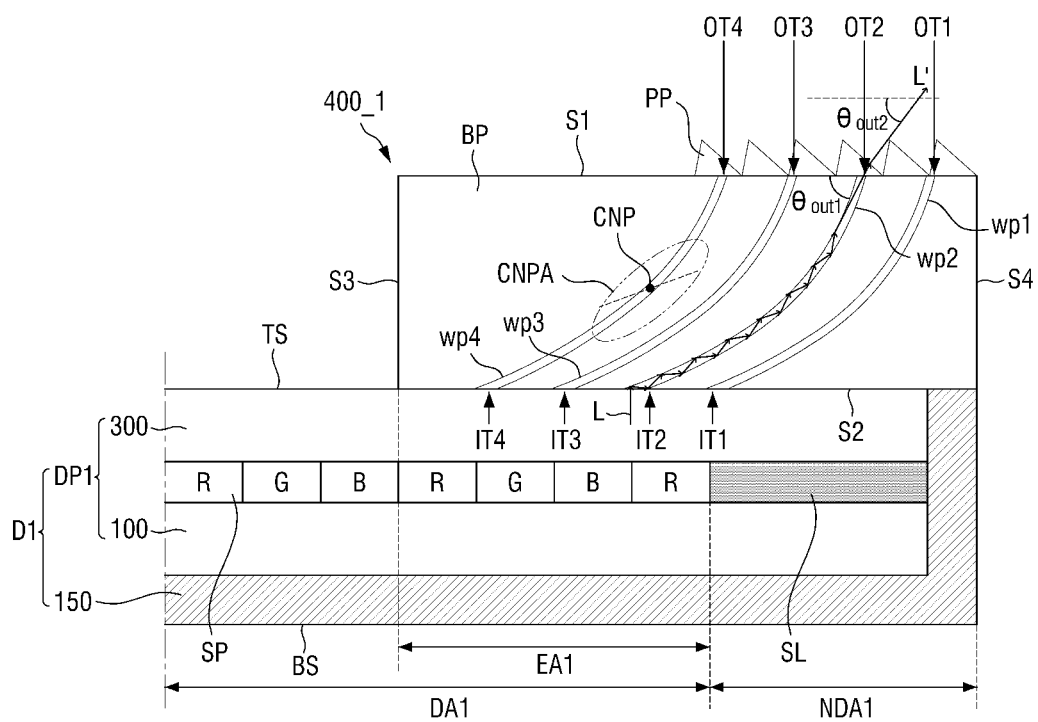
FIG. 17 is a cross-sectional view showing another exemplary embodiment of a part of a first display device and a part of an optical plate.
Figure 18:
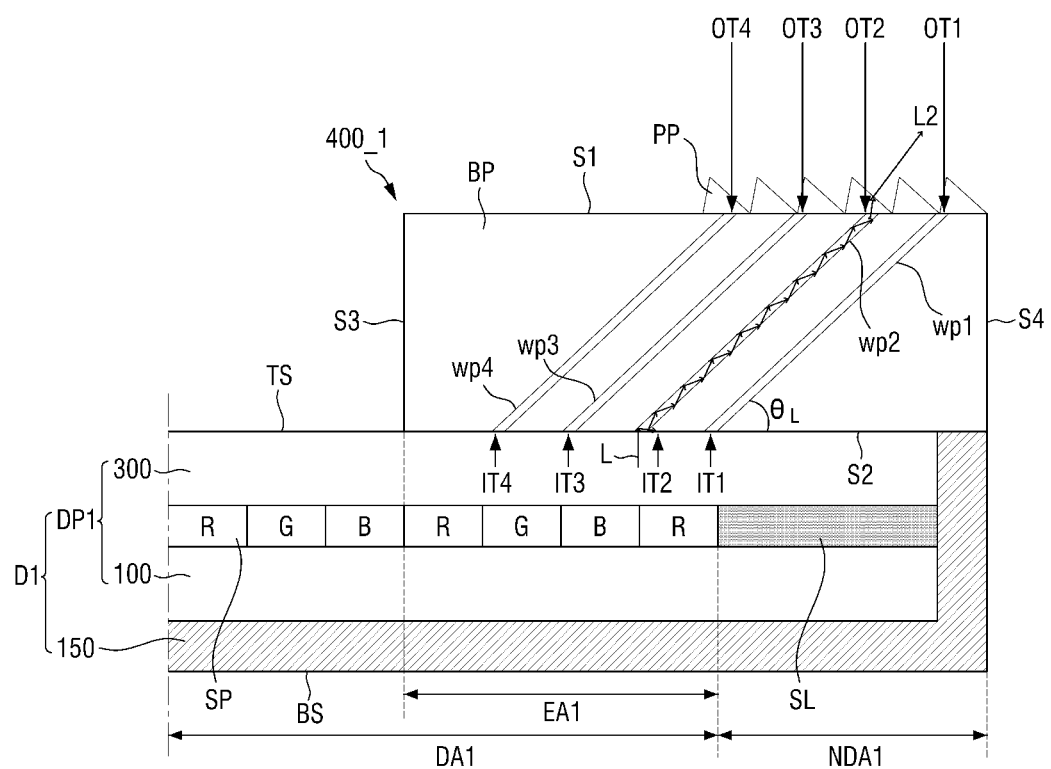
FIG. 18 is a cross-sectional view showing another exemplary embodiment of a part of a first display device and a part of an optical plate.

FIG. 17 is a cross-sectional view showing another exemplary embodiment of a first display device and a part of an optical plate, and FIG. 18 is a cross-sectional view showing another exemplary embodiment of a first display device and a part of an optical plate.

Exemplary embodiments of FIGS. 17 and 18 are different from the exemplary embodiment shown in FIG. 15 in the shape of the optical waveguide WP included in the optical plate 400_1. In FIGS. 17 and 18, a description overlapping with the exemplary embodiment shown in FIG. 15 will be omitted, and differences will be mainly described.

Referring to FIG. 17, each of the first to fourth waveguides WP1, WP2, WP3, and WP4 of another exemplary embodiment of a tiled display apparatus TD may have an inflection point. In another exemplary embodiment, each of the first to fourth waveguides WP1, WP2, WP3, and WP4 may have one inflection point CNP. The inflection area CNPA may be a curved area convex in the direction of the second and fourth surfaces S2 and S4 of the optical plate 400_1. The inflection area CNPA includes a curved area convex in the direction of the second and fourth surfaces S2 and S4, so that the outgoing angle $\theta_{out1}$ at which the light L' is outputted to the first to fourth output terminals OT1, OT2, OT3 and OT4 of the first to fourth optical waveguides WP1, WP2, WP3 and WP4 is further increased, and thus the light L is effectively outputted through the first to fourth output terminal OT1, OT2, OT3, and OT4. Further, the light L passes through the plurality of prism patterns PP disposed on the first to fourth output terminal OT1, OT2, OT3, and OT4 to decrease the outgoing angle $\theta_{out2}$ to be refracted into light L', and the light L' is outputted upward from the non-display area NDA1. Accordingly, the image continuity of the tiled display apparatus TD may be assured even when a user views a screen from a side surface, not a front surface.

Referring to FIG. 18, each of the first to fourth waveguides WP1, WP2, WP3, and WP4 of another exemplary embodiment of a tiled display apparatus TD may have a linear shape without an inflection point. Each of the first to fourth waveguides WP1, WP2, WP3, and WP4 may have a linear shape in which each of the first to fourth input terminals IT1, IT2, IT3, and IT4 disposed on the first edge area EA1 is connected to each of the first to fourth output terminals OT1, OT2, OT3, and OT4 disposed above the first non-display area NDA1, so that the light L inputted to the first to fourth input terminals IT1, IT2, IT3 and IT4 may be effectively totally reflected in the first to fourth optical waveguides WP1, WP2, WP3 and WP4, and thus the light L may be effectively outputted to each of the first to fourth output terminals OT1, OT2, OT3 and OT4. The light L outputted to each of the first to fourth output terminals OT1, OT2, OT3 and OT4 is refracted into light L' while passing through the plurality of prism patterns PP disposed on the first to fourth output terminal OT1, OT2, OT3, and OT4, and the refracted light L' is outputted upward from the first non-display area NDA1. Accordingly, the image continuity of the tiled display apparatus TD may be assured even when a user views a screen from a side surface, not a front surface.

Figure 19:
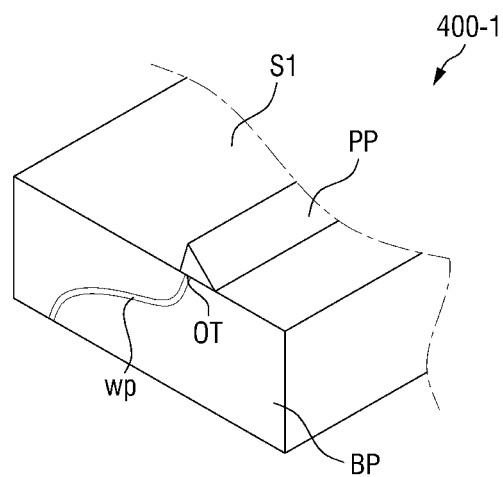
FIG. 19 is a cross-sectional view showing another exemplary embodiment of a part of an optical waveguide.
Figure 20:
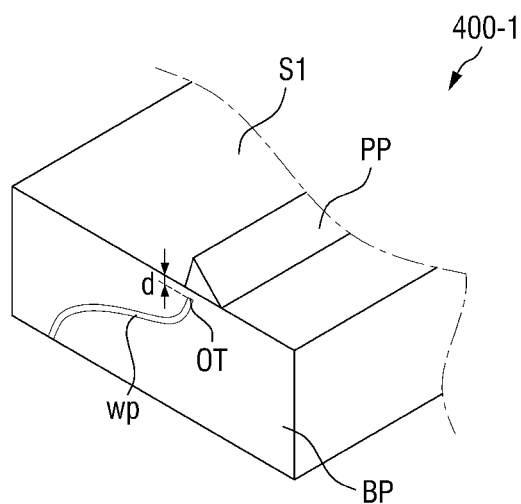
FIG. 20 is a cross-sectional view showing another exemplary embodiment of a part of an optical waveguide.

FIG. 19 is a cross-sectional view showing another exemplary embodiment of a part of an optical waveguide, and FIG. 20 is a cross-sectional view showing another exemplary embodiment of a part of an optical waveguide.

Referring to FIG. 19, in an exemplary embodiment, the output terminal OT of the optical waveguide WP may be exposed to the first surface S1 of the optical plate 400_1. In an exemplary embodiment, the output terminal OT of the optical waveguide WP may be disposed on the same line as the first surface S1 of the optical plate 400_1 to be in contact with the prism pattern PP, for example. Like this, the output terminal OT of the optical waveguide WP directly contacts the prism pattern PP having a refractive index equal to or lower than the refractive index of the optical waveguide WP, thereby minimizing the light leakage between the output terminal OT and the prism pattern PP. However, the invention is not limited thereto. As shown in FIG. 20, the output terminal OT of the optical waveguide WP may be provided to be embedded in the first surface S1 of the optical plate 400_1. In an exemplary embodiment, the output terminal OT of the optical waveguide WP may be disposed at a position lower than the first surface S1 of the optical plate 400_1, for example. In an exemplary embodiment, the output terminal OT of the optical waveguide WP may be disposed at a position lower by a distance d from about 0.01 mm to about 2 mm than the first surface S1 of the optical plate 400_1, for example. The upper portion of the output terminal OT of the optical waveguide WP is filled with the body portion BP of the optical plate 400_1, so that the first surface S1 of the optical plate 400_1 may be made flat, and the prism pattern PP may be disposed on the first surface S1 thereof. However, the invention is not limited thereto, and the upper portion of the output terminal OT of the optical waveguide WP is opened, so that the first surface S1 of the optical plate 400_1 may have a structure in which a groove is defined corresponding to the output terminal OT of the optical waveguide WP. Further, the prism pattern PP is disposed on the first surface S1 of the optical plate 400_1, and thus a gap may be disposed between the output terminal OT of the optical waveguide WP and the prism pattern PP. In another exemplary embodiment, the optical plate 400_1 may have a structure in which a protrusion is disposed on the lower surface E3 (refer to FIG. 15) of the prism pattern PP and is coupled to the groove disposed on the first surface S1 of the optical plate 400_1. In still another exemplary embodiment, a diffusion pattern including beads and the like may be disposed in the groove disposed on the first surface S1 of the optical plate 400_1 to diffuse the light output from the output terminal OT of the optical waveguide WP.

When the output terminal OT of the optical waveguide WP is disposed to be embedded in the first surface S1 of the optical plate 400, there is an advantage that breakage and deformation of the output terminal OT due to external force may be prevented.

Hereinafter, a method of manufacturing the above-described display device will be described.

Figure 21:
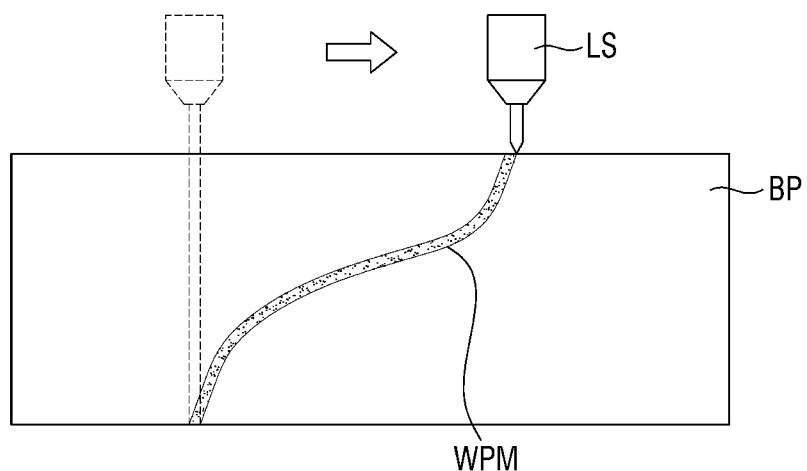
FIGS. 21 to 23 are cross-sectional views showing an exemplary embodiment of a method of manufacturing an optical plate of a tiled display apparatus.
Figure 22:
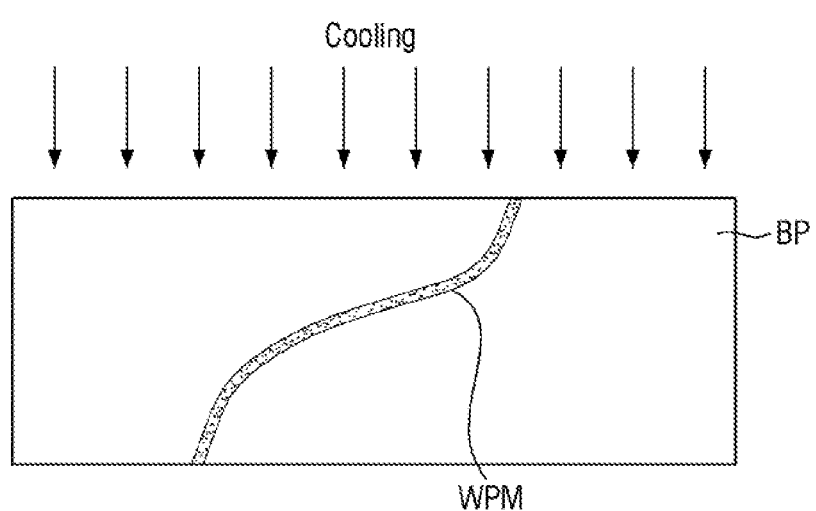
Figure 23:
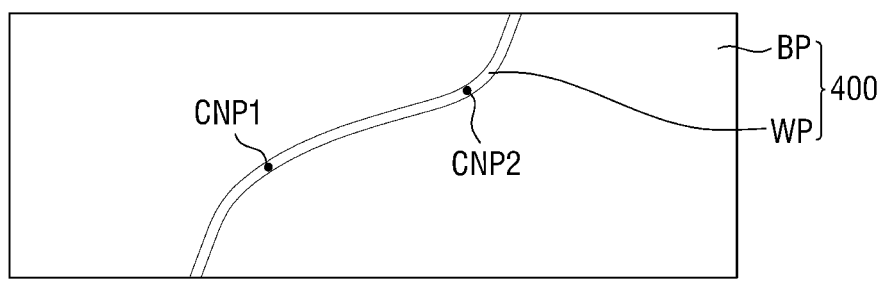

FIGS. 21 to 23 are cross-sectional views showing an exemplary embodiment of a method of manufacturing an optical plate of a tiled display apparatus according to the invention. Components substantially the same as those in FIG. 4 are denoted by the same reference numerals, and a detailed description thereof will be omitted.

Referring to FIG. 21, a body portion BP is irradiated with a microwave laser beam using a laser device LS to melt an area for forming an optical waveguide, thereby forming a melting portion WPM. In an exemplary embodiment, the microwave laser beam may have a pulse of femtosecond (FS, $10^{-15}$ second), for example. Further, the pulse width of the laser beam may be about 20 femtoseconds to about 600 femtoseconds, and the pulse rate thereof may be about 10 Hertz (Hz) to about 200 Megahertz (MHz), for example. However, the invention is not limited thereto.

The femtosecond laser beam may form a melting portion WPM having at least one inflection point because it has high-density energy, may locally process a desired area in a glass substrate having a low focus depth, and does not make a negative influence on its surroundings. However, the invention is not limited thereto, and various pulse laser beams may be used depending on the material of the body portion BP, the shape of the optical waveguide, and the like.

In an exemplary embodiment, the formation of the melting portion WPM may be carried out by moving the laser device LS, and the laser device LS may apply a laser beam to the body portion BP while moving at a speed of about 10 micrometers per second (μm/sec) to about 10 centimeters per second (cm/sec), for example. However, the invention is not limited thereto. The body portion BP may move while fixing the laser device LS.

Referring to FIG. 22, the body portion BP provided with the melting portion WPM is cooled. In an exemplary embodiment, the cooling temperature may be about −200 degrees Celsius (° C.) to about 0° C., for example, but is not limited thereto. Such melting and cooling may be performed in a short time. In an exemplary embodiment, the melting and cooling may be performed within about 2 seconds, for example. However, the invention is not limited thereto, and the melting and cooling time may be changed depending on the length and width of the optical waveguide WP. As the melting portion WPM is cooled, the amount of void in the melting portion WPM decreases, thereby increasing the density of the melting portion WPM.

Referring to FIG. 23, through the melting process using the femtosecond laser and the cooling process for the melting portion WPM, an optical plate 400 including a body portion BP and an optical waveguide WP having higher density higher than the body portion BP and having a first inflection point CNP1 and a second inflection point CNP2 is manufactured. That is, since the optical waveguide WP is provided to have higher density than that of the body portion BP, the optical waveguide WP has a higher refractive index than that of the body portion BP. Thus, the light inputted to the input terminal of the optical waveguide WP is totally reflected in the optical waveguide having the first inflection point CNP1 and the second inflection point CNP2 and is outputted to the output terminal of the optical waveguide WP.

As described above, according to the display device of an exemplary embodiment of the invention, the image outputted from the display area may be expanded upward from the non-display area to prevent an image discontinuity phenomenon.

The effects of the invention are not limited by the foregoing, and other various effects are anticipated herein.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
a display panel including a display area and a non-display area; and
an optical plate disposed on the display panel and including an optical waveguide and a body portion surrounding the optical waveguide, the optical waveguide including:
an input terminal which is disposed on the display area and receives light from the display panel; and
an output terminal which is disposed over the non-display area and outputs the light,
wherein the optical plate further includes a first surface which is an upper surface from which the light is outputted, a second surface disposed between the first surface and the display panel, a third surface which is a side surface defining an exterior innermost sidewall of the body portion connecting the first surface and the second surface and disposed on the display area, and a fourth surface which is a side surface defining an exterior outermost sidewall of the body portion connecting the first surface and the second surface and disposed on the non-display area, the third surface and the fourth surface being perpendicular to the first surface, and
the input terminal is disposed on the second surface, and the output terminal is disposed on the first surface.

2. The display device of claim 1,
wherein the optical waveguide further includes at least one inflection point.

3. The display device of claim 1,
wherein the optical waveguide further includes a first inflection point and a second inflection point located over the first inflection point.

4. The display device of claim 3,
wherein the optical waveguide further includes a first inflection area having a curved shape convex in a direction of the first and third surfaces by the first inflection point and a second inflection area having a curved shape convex in a direction of the second and fourth surfaces.

5. The display device of claim 4,
wherein the body portion and the optical waveguide include a glass material.

6. The display device of claim 5,
wherein the optical waveguide has a refractive index higher than a refractive index of the body portion.

7. The display device of claim 6,
wherein a difference in refractive index between the optical waveguide and the body portion is about 0.002 to about 0.2.

8. The display device of claim 7,
wherein each of the output terminal and the input terminal has a width of about 10 micrometers to about 50 micrometers.

9. The display device of claim 7,
wherein the optical plate further includes a prism pattern disposed on the first surface in correspondence with the non-display area.

10. The display device of claim 9,
wherein the prism pattern includes a lower surface contacting the first surface and first and second inclined surfaces connected to the lower surface, and
a second acute angle defined by the lower surface and the second inclined surface is smaller than a first acute angle defined by the lower surface and the first inclined surface.

11. A tiled display apparatus, comprising:
a display device unit including a plurality of display devices each having a display panel including a display area and a non-display area; and
an optical plate disposed on the display panel and including an optical waveguide and a body portion surrounding the optical waveguide, the optical waveguide including:
an input terminal which is disposed on the display area and receives light from the display panel; and
an output terminal which is disposed over the non-display area and outputs the light,
wherein the display area includes a central area and an edge area surrounding the central area, and the optical waveguide of the optical plate is disposed on the edge area and the non-display area,
wherein an opening disposed corresponding to the central area is defined in the body portion of optical plate,
wherein a sidewall of the opening is perpendicular to an upper surface of the optical plate from which the light is outputted, and
wherein a sidewall defining an exposed outermost sidewall of the body portion surrounding the optical waveguide output terminal is perpendicular to the upper surface of the optical plate.

12. The tiled display apparatus of claim 11,
wherein the optical waveguide includes a first inflection point and a second inflection point located over the first inflection point.

13. The tiled display apparatus of claim 12,
wherein the optical waveguide includes a first inflection area having a curved shape convex in a direction of the first and third surfaces by the first inflection point and a second inflection area having a curved shape convex in a direction of the second and fourth surfaces.

14. The tiled display apparatus of claim 13,
wherein the body portion and the optical waveguide include a glass material.

15. The tiled display apparatus of claim 14,
wherein a difference in refractive index between the optical waveguide and the body portion is about 0.002 to about 0.2.

* * * * *